United States Patent
Ma et al.

(10) Patent No.: US 11,916,229 B2
(45) Date of Patent: Feb. 27, 2024

(54) POSITIVE ELECTRODE ACTIVE MATERIAL AND PREPARATION METHOD THEREFOR, POSITIVE ELECTRODE PLATE CONTAINING SAME, SECONDARY BATTERY, AND POWER CONSUMING DEVICE

(71) Applicant: CONTEMPORARY AMPEREX TECHNOLOGY CO., LIMITED, Ningde (CN)

(72) Inventors: Qingyan Ma, Ningde (CN); Yuzhen Zhao, Ningde (CN); Yingjie Guan, Ningde (CN); Yan Wen, Ningde (CN); Qisen Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/335,143

(22) Filed: Jun. 15, 2023

(65) Prior Publication Data

US 2023/0335723 A1 Oct. 19, 2023

Related U.S. Application Data

(63) Continuation of application No. PCT/CN2022/084479, filed on Mar. 31, 2022.

(51) Int. Cl.
*H01M 4/36* (2006.01)
*H01M 4/58* (2010.01)
(Continued)

(52) U.S. Cl.
CPC ......... *H01M 4/366* (2013.01); *H01M 4/0404* (2013.01); *H01M 4/0471* (2013.01);
(Continued)

(58) Field of Classification Search
CPC .... H01M 4/366; H01M 4/5825; H01M 4/583; H01M 4/622; H01M 4/0471; H01M 4/0404; H01M 2004/021; H01M 2004/028
See application file for complete search history.

(56) References Cited

U.S. PATENT DOCUMENTS

2020/0067101 A1\* 2/2020 Pan .......................... C09D 5/24

FOREIGN PATENT DOCUMENTS

| CN | 103975474 A | 8/2014 |
|---|---|---|
| CN | 104218218 A | 12/2014 |

(Continued)

OTHER PUBLICATIONS

International Search Report received in the corresponding International Application PCT/CN2022/084479, dated Oct. 31, 2022.

*Primary Examiner* — Brian R Ohara
*Assistant Examiner* — Brent C Thomas
(74) *Attorney, Agent, or Firm* — Kilpatrick Townsend & Stockton LLP

(57) ABSTRACT

A positive electrode active material and a preparation method therefor, a positive electrode plate containing same, a secondary battery, and a power consuming device are provided. The positive electrode active material has a core-shell structure, comprising an inner core and a shell coating the inner core, wherein the inner core comprises $Li_{1+x}Mn_{1-y}A_yP_{1-z}R_zO_4$, and the shell comprises a first coating layer coating the inner core, and a second coating layer coating the first coating layer, and a third coating layer coating the second coating layer. The positive electrode active material of the present application enables the secondary battery to have a higher energy density, and a good rate performance, cycling performance and safety performance.

20 Claims, 3 Drawing Sheets

(51) Int. Cl.
*H01M 4/583* (2010.01)
*H01M 4/62* (2006.01)
*H01M 4/04* (2006.01)
H01M 4/02 (2006.01)

(52) U.S. Cl.
CPC ......... *H01M 4/583* (2013.01); *H01M 4/5825* (2013.01); *H01M 4/622* (2013.01); *H01M 2004/021* (2013.01); *H01M 2004/028* (2013.01)

(56) References Cited

FOREIGN PATENT DOCUMENTS

| | | |
|---|---|---|
| CN | 104600273 A | 5/2015 |
| CN | 106058225 A | 10/2016 |
| CN | 109309207 A | 2/2019 |
| CN | 109309228 A | 2/2019 |
| CN | 113097456 A | 7/2021 |

\* cited by examiner

POSITIVE ELECTRODE ACTIVE MATERIAL AND PREPARATION METHOD THEREFOR, POSITIVE ELECTRODE PLATE CONTAINING SAME, SECONDARY BATTERY, AND POWER CONSUMING DEVICE

CROSS-REFERENCE TO RELATED APPLICATIONS

This application is a continuation of International Application PCT/CN2022/084479, filed Mar. 31, 2022 and entitled "POSITIVE ELECTRODE ACTIVE MATERIAL AND PREPARATION METHOD THEREFOR, POSITIVE ELECTRODE PLATE CONTAINING SAME, SECONDARY BATTERY, AND POWER CONSUMING DEVICE", which is incorporated herein by reference in its entirety.

TECHNICAL FIELD

The present application belongs to the technical field of batteries, and in particular relates to a positive electrode active material and a preparation method therefor, a positive electrode plate containing same, a secondary battery, and a power consuming device.

BACKGROUND ART

In recent years, secondary batteries have been widely used in energy storage power systems such as hydroelectric, thermal, wind and solar power plants, as well as electric tools, electric bicycles, electric motorcycles, electric vehicles, military equipment, aerospace and other fields. With the application and popularization of secondary batteries, the safety performance thereof has attracted more and more attention. Lithium manganese phosphate is one of the most concerned positive electrode active materials at present due to a high capacity, a good safety performance, an abundant raw material source, etc. However, the lithium manganese phosphate is liable to dissolve a manganese ion during charging, resulting in rapid capacity fading. Therefore, it is necessary to provide a positive electrode active material with a good overall performance.

SUMMARY OF THE INVENTION

The present application aims to provide a positive electrode active material and a preparation method therefor, a positive electrode plate containing same, a secondary battery, and a power consuming device. The secondary battery containing the positive electrode active material has a higher energy density, and a good rate performance, cycling performance and safety performance.

A first aspect of the present application provides a positive electrode active material with a core-shell structure, comprising an inner core and a shell coating the inner core, wherein
the inner core comprises $Li_{1+x}Mn_{1-y}A_yP_{1-z}R_zO_4$, wherein x is −0.100 to 0.100, y is 0.001 to 0.500, z is 0.001 to 0.100, A is one or more selected from Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S; and
the shell comprises a first coating layer coating the inner core, a second coating layer coating the first coating layer, and a third coating layer coating the second coating layer, wherein the first coating layer comprises a pyrophosphate of $MP_2O_7$ and a phosphate of $XPO_4$, and M and X are each independently selected from one or more of Li, Fe, Ni, Mg, Co, Cu, Zn, Ti, Ag, Zr, Nb, and Al;
the second coating layer comprises carbon; and
the third coating layer comprises a polymer and the polymer comprises one or more selected from a polysiloxane with a linear structure and a polysiloxane with a cyclic structure.

By doping lithium manganese phosphate with specific elements and coating the surface of the lithium manganese phosphate, the present application can effectively inhibit the dissolution of manganese ions during lithium de-intercalation while promoting the migration of lithium ions, thereby improving the rate performance, cycling performance, and safety performance of the secondary battery.

In any embodiment of the present application, the polymer comprises at least one structural unit represented by formula 1,

$R_1$ and $R_2$ each independently represent H or at least one of the group consisting of the following functional groups: —COOH, —OH, —SH, —CN, —SCN, amino, a phosphate group, a carboxylate group, acylamino, an aldehyde group, sulfonyl, a polyether chain segment, a C1-C20 aliphatic hydrocarbon group, a C1-C20 halogenated aliphatic hydrocarbon group, a C1-C20 heteroaliphatic hydrocarbon group, a C1-C20 halogenated heteroaliphatic hydrocarbon group, a C6-C20 aromatic hydrocarbon group, a C6-C20 halogenated aromatic hydrocarbon group, a C2-C20 heteroaromatic aromatic hydrocarbon group, and a C2-C20 halogenated heteroaromatic hydrocarbon group. Optionally, $R^1$ and $R^2$ each independently represent H or at least one of the group consisting of the following functional groups: —OH, —SH, amino, a phosphate group, a polyether chain segment, C1-C8 alkyl, C1-C8 halogenated alkyl, C1-C8 heteroalkyl, C1-C8 halogenated heteroalkyl, C2-C8 alkenyl, and C2-C8 halogenated alkenyl.

These functional groups can chelate manganese ions, reduce dissolution of manganese ions, simultaneously remove F-containing ions from an electrolyte solution, and further relieve corrosion of the surface of the positive electrode active material by an acidic substance in the electrolyte solution, thereby significantly improving the cycling performance of the secondary battery.

In any embodiment of the present application, the polysiloxane with a linear structure further comprises a capping group. Optionally, the capping group includes at least one selected from the group consisting of the following functional groups: a polyether, C1-C8 alkyl, C1-C8 halogenated alkyl, C1-C8 heteroalkyl, C1-C8 halogenated heteroalkyl, C2-C8 alkenyl, C2-C8 halogenated alkenyl, a C6-C20 aromatic hydrocarbon group, C1-C8 alkoxy, a C2-C8 epoxy group, hydroxyl, C1-C8 hydroxyalkyl, amino, C1-C8 aminoalkyl, carboxyl, and C1-C8 carboxyalkyl.

In any embodiment of the present application, the polysiloxane with a linear structure includes one or more of polydimethylsiloxane, polydiethylsiloxane, polymethyl ethyl siloxane, polymethylvinylsiloxane, polyphenylmethylsiloxane, polymethylhydrogensiloxane, carboxy-functionalized polysiloxane, epoxy-terminated polysiloxane, methoxy-terminated polydimethylsiloxane, polymethylchloropropylsiloxane, thiopropyl polysiloxane, aminoethylaminopropyl polydimethylsiloxane, hydroxypropyl-terminated polysiloxane, hydroxyl-terminated polydimethylsiloxane, polyether-terminated polydimethylsiloxane, aminopropyl-pendant polysiloxane, aminopropyl-terminated polydimethylsiloxane, hydroxymethyl-pendant polysiloxane, hydroxypropyl-pendant polysiloxane, side-chain-polyether-grafted polydimethylsiloxane, and side-chain-phosphate-grafted polydimethylsiloxane.

Optionally, the polysiloxane with a linear structure includes one or more of hydroxyl-terminated polydimethylsiloxane, thiopropyl polysiloxane, aminoethylaminopropyl polydimethylsiloxane, side-chain-polyether-grafted polydimethylsiloxane, and side-chain-phosphate-grafted polydimethylsiloxane.

In any embodiment of the present application, the polysiloxane with a cyclic structure includes one or more of 1,3,5,7-octamethylcyclotetrasiloxane, 1,3,5,7-tetrahydro-1,3,5,7-tetramethylcyclotetrasiloxane, cyclopentadimethylsiloxane, 2,4,6,8-tetramethylcyclotetrasiloxane, 2,4,6,8-tetramethyl-2,4,6,8-tetravinylcyclotetrasiloxane, cyclic polymethylvinylsiloxane, hexadecylmethylcyclooctasiloxane, tetradecamethylcylcycloheptasiloxane, and cyclic polydimethylsiloxane.

In any embodiment of the present application, the polymer is selected from a polysiloxane with a linear structure. Since the electrons in a ring of the polysiloxane with a cyclic structure have a certain delocalizability. Therefore, compared with the polysiloxane with a linear structure, an Si—O skeleton of the polysiloxane with a cyclic structure has a lower affinity for an electron-rich F-containing ion, thus has a slightly lower rate of removing the F-containing ions from an electrolyte solution, leading to a slightly lower effect on reducing the dissolution of manganese ions and a slightly poorer effect on improving the cycling performance of the secondary battery.

In any embodiment of the present application, the polymer has a number-average molecular weight of 300,000 or less, optionally 400 to 200,000. When the number-average molecular weight of the polymer is within a proper range, the positive electrode active material may have both a good dynamic performance and a good high-temperature stability.

In any embodiment of the present application, the mass percentage content of a polar functional group in the polysiloxane is a with $0 \leq \alpha < 50\%$, optionally $5\% \leq \alpha \leq 30\%$. When the content of the polar functional group in the polysiloxane is within a proper range, the coating modification effect on the inner core is better.

In any embodiment of the present application, the coating amount of the first coating layer is greater than 0 wt % and less than or equal to 7 wt %, optionally 4-5.6 wt %, based on the weight of the inner core. When the coating amount of the first coating layer is within the above range, the function of the first coating layer may be effectively exerted without affecting the dynamic performance of the secondary battery due to the excessively thick coating layer.

In any embodiment of the present application, the coating amount of the second coating layer is greater than 0 wt % and less than or equal to 6 wt %, optionally 3-5 wt %, based on the weight of the inner core. Therefore, the presence of the second coating layer may avoid a direct contact between the positive electrode active material and the electrolyte solution, reduce corrosion to the positive electrode active material caused by the electrolyte solution, and improve the conductivity of the positive electrode active material. When the coating amount of the second layer is within the above range, the gram capacity of the positive electrode active material may be effectively increased.

In any embodiment of the present application, the coating amount of the third coating layer is greater than 0 wt % and less than or equal to 10 wt %, optionally greater than 0 wt % and less than or equal to 5 wt %, further greater than 0 wt % and less than or equal to 2 wt %, based on the weight of the inner core of the first coating layer and the second coating layer. Therefore, when the coating amount of the third coating layer is within the above range, the coating modification effect thereof on the inner core is better, the dissolution of the manganese ions can be further inhibited, and at the same time the transport of lithium ions may be further promoted.

In any embodiment of the present application, the phosphate of the first coating layer has an interplanar spacing of 0.345-0.358 nm and an included angle of 24.25°-26.45° for crystal orientation (111). Therefore, the cycling performance and rate performance of the secondary battery are further improved.

In any embodiment of the present application, the pyrophosphate of the first coating layer has an interplanar spacing of 0.293-0.326 nm and an included angle of 26.41°-32.57° for crystal orientation (111). Therefore, the cycling performance and rate performance of the secondary battery are further improved.

In any embodiment of the present application, in the inner core, the ratio of y to 1-y is 1:10 to 10:1, optionally 1:4 to 1:1. Therefore, the energy density and cycling performance of the secondary battery may be further improved.

In any embodiment of the present application, in the inner core, the ratio of z to 1-z is 1:9 to 1:999, optionally 1:499 to 1:249. Therefore, the energy density and cycling performance of the secondary battery may be further improved.

In any embodiment of the present application, the weight ratio of the pyrophosphate to the phosphate in the first coating layer is 1:3 to 3:1, optionally 1:3 to 1:1. Therefore, the pyrophosphate and the phosphate in a proper weight ratio range can not only effectively prevent the dissolution of the manganese ions, but can also effectively reduce the content of lithium impurities on the surface, and reduce interfacial side reactions, thereby improving the rate performance, cycling performance, and safety performance of the secondary battery.

In any embodiment of the present application, the pyrophosphate and the phosphate each independently have a crystallinity of 10% to 100%, optionally 50% to 100%. Therefore, the pyrophosphate and phosphate with the crystallinity being within the above ranges are beneficial to give full play to the role of the pyrophosphate on inhibiting the dissolution of manganese ions and the effect of the phosphate on reducing the content of lithium impurities on the surface and reducing interfacial side reactions.

In any embodiment of the present application, A is selected from at least two of Fe, Ti, V, Ni, Co, and Mg. Therefore, since A is two or more metals in the above range, doping at the manganese site is advantageous to enhance the doping effect, further reduce the surface oxygen activity, and inhibit the dissolution of manganese ions.

In any embodiment of the present application, the Li/Mn antisite defect concentration of the positive electrode active material is 4% or less, optionally 2% or less. Therefore, the gram capacity and rate performance of the positive electrode active material may be improved.

In any embodiment of the present application, the lattice change rate of the positive electrode active material is 6% or less, optionally 4% or less. Therefore, the rate performance of the secondary battery may be improved.

In any embodiment of the present application, the surface oxygen valence state of the positive electrode active material is −1.88 or less, optionally −1.98 to −1.88. Therefore, the cycling performance and high-temperature storage performance of the secondary battery may be improved.

In any embodiment of the present application, the compacted density of the positive electrode active material under 3 tons is 2.0 g/cm$^3$ or more, optionally 2.2 g/cm$^3$ or more. Therefore, the volumetric energy density of the secondary battery may be improved.

A second aspect of the present application provides a method for preparing a positive electrode active material, comprising the following steps:

a step of providing an inner core material, wherein: the inner core comprises $Li_{1+x}Mn_{1-y}A_yP_{1-z}R_zO_4$, wherein x is −0.100 to 0.100, y is 0.001 to 0.500, z is 0.001 to 0.100, A is one or more selected from Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S;

a coating step, involving: providing an $MP_2O_7$ powder and an $XPO_4$ suspension containing a carbon source, adding the inner core material and the $MP_2O_7$ powder into the $XPO_4$ suspension containing the carbon source, mixing same, sintering the mixture to obtain an inner core with a first coating layer and a second coating layer, and coating the obtained inner core with the first coating layer and the second coating layer with a polymer by dry coating or wet coating to obtain a positive electrode active material, wherein the polymer comprises one or more selected from a polysiloxane with a linear structure and a polysiloxane with a cyclic structure, and M and X are each independently selected from one or more of Li, Fe, Ni, Mg, Co, Cu, Zn, Ti, Ag, Zr, Nb, and Al, and the positive electrode active material has a core-shell structure, comprising the inner core and a shell coating the inner core, with the shell comprising the first coating layer coating the inner core, the second coating layer coating the first coating layer, and the third coating layer coating the second coating layer, wherein the first coating layer comprises a pyrophosphate of $MP_2O_7$ and a phosphate of $XPO_4$, the second coating layer comprises carbon, the third coating layer comprises the polymer, and the polymer comprises one or more selected from the polysiloxane with a linear structure and the polysiloxane with a cyclic structure.

In any embodiment of the present application, the step of providing the inner core material comprises the following steps:

step (1): mixing and stirring a manganese source, an element A source, and an acid in a container to obtain manganese salt particles doped with element A; and step (2): mixing the manganese salt particles doped with element A with a lithium source, a phosphorus source, and an element R source in a solvent to obtain a slurry, and sintering the slurry under inert gas atmosphere protection to obtain lithium manganese phosphate doped with element A and element R, wherein the lithium manganese phosphate doped with element A and element R is $Li_{1+x}Mn_{1-y}A_yP_{1-z}R_zO_4$, where x is −0.100 to 0.100, y is 0.001 to 0.500, z is 0.001 to 0.100, A is selected from one or more of Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S.

In any embodiment of the present application, step (1) is performed at a temperature of 20-120° C., optionally 25-80° C.

In any embodiment of the present application, the stirring in step (1) is performed at 500-700 rpm for 60-420 minutes, optionally for 120-360 minutes.

Therefore, by controlling the reaction temperature, the stirring speed, and the mixing time during doping, the doping elements may be uniformly distributed, and the sintered material has a higher crystallinity, thereby improving the gram capacity, rate performance, etc., of the positive electrode active material.

In any embodiment of the present application, the element A source is selected from one or more of an elementary substance, a sulfate, a halide, a nitrate, an organic acid salt, an oxide or a hydroxide of element A.

In any embodiment of the present application, the element R source is selected from one or more of an elementary substance, a sulfate, a halide, a nitrate, an organic acid salt, an oxide or a hydroxide of element R and an inorganic acid of element R.

Therefore, by selecting sources of the doping elements in the above ranges, the performance of the positive electrode active material may be effectively improved.

In any embodiment of the present application, the $MP_2O_7$ powder is prepared by the following method: adding an element M source and a phosphorus source to a solvent to obtain a mixture, adjusting the pH of the mixture to 4-6, stirring and fully reacting the mixture, and then drying and sintering the reaction product to obtain the powder, wherein M is selected from one or more of Li, Fe, Ni, Mg, Co, Cu, Zn, Ti, Ag, Zr, Nb, or Al.

In any embodiment of the present application, during the process of preparing the $MP_2O_7$ powder, the drying is performed at 100-300° C., optionally 150-200° C. for 4-8 hours.

In any embodiment of the present application, during the process of preparing the $MP_2O_7$ powder, the sintering is performed at 500-800° C., optionally 650-800° C., in an inert gas atmosphere for 4-10 hours.

In any embodiment of the present application, in the coating step, when the inner core with the first coating layer and the second coating layer is obtained, the sintering is performed at a temperature of 500-800° C. for 4-10 hours. Therefore, the gram capacity and rate performance of the positive electrode active material may be further improved by controlling the sintering temperature and time during coating.

A third aspect of the present application provides a positive electrode plate, comprising a positive electrode current collector and a positive electrode film layer arranged on at least one surface of the positive electrode current collector, wherein the positive electrode film layer comprises the positive electrode active material of the first aspect of the present application or a positive electrode active material prepared by the method of the second aspect of the present application, and the content of the positive electrode active material in the positive electrode film layer is 10 wt % or more, based on the total weight of the positive electrode film layer.

In any embodiment of the present application, the content of the positive electrode active material in the positive electrode film layer is 90-99.5 wt %, based on the total weight of the positive electrode film layer. When the content of the positive electrode active material is within the above range, it is advantageous to fully exert the advantages of the positive electrode active material of the present application.

In any embodiment of the present application, the solid-liquid contact angle between the positive electrode film layer and a non-aqueous organic solvent is between 3° and 90°, optionally between 3° and 60°, further between 10° and 30°. When the contact angle is within a proper range, the secondary battery may have both a higher energy density and a good rate performance, cycling performance and safety performance.

In any embodiment of the present application, the positive electrode film layer has a porosity of 15% to 50%, optionally 15% to 30%. When the porosity is within a proper range, the secondary battery may have both a higher energy density and a good rate performance, cycling performance and safety performance.

A fourth aspect of the present application provides a secondary battery, comprising the positive electrode active material of the first aspect of the present application, or a positive electrode active material prepared by the method of the second aspect of the present application, or the positive electrode plate of the third aspect of the present application.

A fifth aspect of the present application provides a power consuming device, comprising the secondary battery of the fourth aspect of the present application.

The positive electrode plate, the secondary battery, and the power consuming device of the present application comprise the positive electrode active material of the present application, and thus have at least the same advantages as the positive electrode active material.

BRIEF DESCRIPTION OF THE DRAWINGS

In order to illustrate the technical solutions of the examples of the present application more clearly, the drawings used in the examples of the present application will be described briefly below. Apparently, the drawings described below are merely some embodiments of the present application, and those of ordinary skill in the art may derive other drawings from these drawings without creative efforts.

Figure 1:
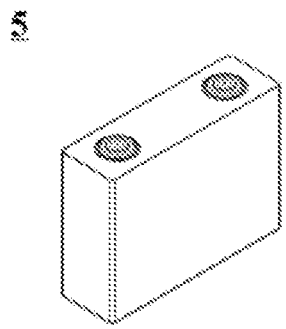
FIG. 1 is a schematic diagram of an embodiment of the secondary battery of the present application.

In the drawings, the figures are not necessarily drawn to scale. List of reference signs: 1 battery pack, 2 upper case body, 3 lower case body, 4 battery module, 5 secondary battery, 51 housing, 52 electrode assembly, and 53 cover plate.

DETAILED DESCRIPTION OF EMBODIMENTS

Hereinafter, embodiments of the positive electrode active material and the preparation method therefor, the positive electrode plate containing same, the secondary battery, and the power consuming device of the present application are specifically disclosed with reference to the accompanying drawings as appropriate. However, unnecessary detailed illustrations may be omitted in some instances. For example, there are situations where detailed description of well-known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in the claims.

The "ranges" disclosed in the present application are defined in the form of lower and upper limits. A given range is defined by selecting a lower limit and an upper limit, and the selected lower and upper limits defining the boundaries of the particular range. Ranges defined in this manner may be inclusive or exclusive, and may be arbitrarily combined, that is, any lower limit may be combined with any upper limit to form a range. For example, if the ranges 60-120 and 80-110 are listed for a particular parameter, it should be understood that the ranges 60-110 and 80-120 are also contemplated. Additionally, if minimum range values 1 and 2 are listed and maximum range values 3, 4, and 5 are listed, the following ranges are all contemplated: 1-3, 1-4, 1-5, 2-3, 2-4, and 2-5. In the present application, unless stated otherwise, the numerical range "a-b" denotes an abbreviated representation of any combination of real numbers between a and b, where both a and b are real numbers. For example, the numerical range "0-5" means that all the real numbers between "0-5" have been listed herein, and "0-5" is just an abbreviated representation of combinations of these numerical values. In addition, when a parameter is expressed as an integer ≥2, it is equivalent to disclosing that the parameter is, for example, an integer of 2, 3, 4, 5, 6, 7, 8, 9, 10, 11, 12, etc.

Unless otherwise stated, all the embodiments and optional embodiments of the present application may be combined with one another to form new technical solutions, and such technical solutions should be considered to be included in the disclosure of the present application.

Unless otherwise stated, all the technical features and optional technical features of the present application may be combined with one another to form new technical solutions, and such technical solutions should be considered to be included in the disclosure of the present application.

Unless otherwise stated, all the steps of the present application may be performed sequentially or randomly, preferably sequentially. For example, the method comprising steps (a) and (b) indicates that the method may comprise steps (a) and (b) performed sequentially, or may also comprise steps (b) and (a) performed sequentially. For example, reference to "the method may further comprise step (c)" indicates that step (c) may be added to the method in any order, e.g., the method may comprise steps (a), (b), and (c), steps (a), (c), and (b), or also steps (c), (a), and (b), etc.

The terms "comprise" and "include" mentioned in the present application are open-ended or may also be closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B". More specifically, the condition "A or B" is satisfied by any one of the following: A is true (or present) and B is false (or not present); A is false (or not present) and B is true (or present); or both A and B are true (or present).

It should be noted that herein, the median particle size Dv50 refers to the corresponding particle size when the cumulative volume distribution percentage of a material reaches 50%. In the present application, the median particle size Dv50 of a material may be determined using a laser diffraction particle size analysis method. For example, the determination may be performed with reference to the standard GB/T 19077-2016 by using a laser particle size analyzer (e.g., Malvern Master Size 3000).

As used herein, the term "aliphatic hydrocarbon group" includes alkyl, alkenyl, and alkynyl, and the term "heteroaliphatic hydrocarbon group" refers to an aliphatic hydrocarbon group containing a heteroatom (e.g., N, O, S, etc.). The term "heteroalkyl" refers to an alkyl that contains a heteroatom (e.g., N, O, S, etc.), and may be, for example, alkoxy, alkylthio, etc.

Herein, the term "coating layer" refers to a substance layer coating an inner core, the substance layer may completely or partially coat the inner core, and the "coating layer" is used for convenience of description only and is not intended to limit the present invention. In addition, each coating layer may be completely coated or may also be partially coated.

Herein, the term "source" refers to a compound as a source of an element. By way of example, the varieties of the "source" include, but are not limited to a carbonate, a sulfate, a nitrate, an elementary substance, a halide, an oxide, a hydroxide, etc.

In the present application, "about" a numerical value means a range, i.e., a range of ±10% of the numerical value.

The inventors of the present application have found in practical operations that a lithium manganese phosphate positive electrode active material has relatively serious dissolution of manganese ions during deep charging and discharging. Although there has been an attempt to reduce interfacial side reactions by coating lithium iron phosphate with lithium manganese phosphate in the prior art, such coating cannot prevent the dissolved manganese ions from migration to the electrolyte solution. After migration to a negative electrode, the dissolved manganese ions are reduced to the metal manganese. The generated manganese metal is equivalent to a "catalyst" and may catalyze the decomposition of a solid electrolyte interphase (SEI) film on the surface of the negative electrode. Part of the generated byproduct is gaseous, which easily causes an expansion of the battery and affects the safety performance of the secondary battery. The other part of the generated byproduct is deposited on the surface of the negative electrode, thereby blocking channels for lithium ions to come in and out of the negative electrode, causing the impedance of the secondary to increase, and affecting the dynamic performance of the battery. In addition, in order to make compensation for the lost SEI film, the electrolyte solution and the active lithium ions inside the battery are continuously consumed, which irreversibly affects the capacity retention rate of the secondary battery.

After extensive research, the inventors have found that for the lithium manganese phosphate positive electrode active material, problems such as serious manganese ion dissolution and a high surface reaction activity may be caused by the Jahn-Teller effect of $Mn^{3+}$ and a change in the size of the $Li^+$ channel after delithiation. Therefore, by modifying the lithium manganese phosphate, the inventors obtain the positive electrode active material that can significantly reduce the dissolution of manganese ions and the lattice change rate, and in turn has a good rate performance, cycling performance, and safety performance.

Positive Electrode Active Material

A first aspect of the present application provides a positive electrode active material with a core-shell structure, comprising an inner core and a shell coating the inner core, wherein the inner core comprises $Li_{1+x}Mn_{1-y}A_yP_{1-z}R_zO_4$, wherein x is −0.100 to 0.100, y is 0.001 to 0.500, z is 0.001 to 0.100, A is one or more selected from Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S; and the shell comprises a first coating layer coating the inner core, a second coating layer coating the first coating layer, and a third coating layer coating the second coating layer, wherein the first coating layer comprises a pyrophosphate of $MP_2O_7$ and a phosphate of $XPO_4$, and M and X are each independently selected from one or more of Li, Fe, Ni, Mg, Co, Cu, Zn, Ti, Ag, Zr, Nb, and Al;

the second coating layer comprises carbon; and the third coating layer comprises a polymer and the polymer comprises one or more selected from a polysiloxane with a linear structure and a polysiloxane with a cyclic structure.

Unless otherwise stated, in the above-mentioned chemical formula, when A is a combination of at least two of the above-mentioned elements, the above definition of the numerical range of y not only represents a definition of the stoichiometric number of each element as A, but also represents a definition of the sum of the stoichiometric numbers of all the elements as A. For example, when A is two or more elements A1, A2 . . . An, the stoichiometric numbers y1, y2 . . . yn of A1, A2 . . . An each fall within the numerical range of y defined in the present application, and the sum of y1, y2 . . . yn shall also fall within this numerical range. Similarly, when R is two or more elements, the definition of the numerical range of the stoichiometric number of R in the present application also has the above meaning.

The lithium manganese phosphate positive electrode active material of the present application is a core-shell structure with three coating layers, wherein the inner core comprises $Li_{1+x}Mn_{1-y}A_yP_{1-z}R_zO_4$. In the inner core, element A doped at the manganese site of lithium manganese phosphate facilitates the reduction of the lattice change rate of the lithium manganese phosphate during the process of lithium de-intercalation, improves the structural stability of the lithium manganese phosphate positive electrode active material, greatly reduces the dissolution of manganese ions, and reduces the oxygen activity on the particle surface. Element R doped at the phosphorus site facilitates changing the difficulty of the variation of the Mn—O bond length, thus reduces the migration barrier of lithium ions, promotes the migration of lithium ion, and improves the rate performance of the secondary battery.

The first coating layer of the positive electrode active material of the present application comprises a pyrophosphate and a phosphate. Due to the high migration barrier (>1 eV) of transition metals in the pyrophosphate, the dissolution of the transition metals may be effectively inhibited. In addition, the phosphate has an excellent lithium ion conductivity and may reduce the content of lithium impurities on the surface.

The second coating layer of the positive electrode active material of the present application is a carbon-containing layer, and thus may effectively improve the electrical conductivity and desolvation ability of $LiMnPO_4$. In addition, the "barrier" effect of the second coating layer may further hinder the migration of the manganese ion to the electrolyte solution and reduce the corrosion of the positive electrode active material by the electrolyte solution.

The third coating layer of the positive electrode active material of the present application comprises one or more of a polysiloxane with a linear structure and a polysiloxane with a cyclic structure. The Si—O skeleton of the polysiloxane may remove F-containing ions from the electrolyte solution and relieve the corrosion of the surface of the positive electrode active material by an acidic substance. The polysiloxane has certain hydrophobicity, which may increase the contact angle between the electrolyte solution and the positive electrode plate and further relieve the corrosion of the surface of the positive electrode active material by the electrolyte solution. In addition, the third coating layer also plays a role of isolating the electrolyte solution and the positive electrode active material, thus may further hinder the migration of manganese ions to the electrolyte solution, reduces the corrosion of the positive electrode active material by the electrolyte solution, and thus significantly improve the cycling performance.

Therefore, by doping lithium manganese phosphate with specific elements and coating the surface of the lithium manganese phosphate, the present application can effectively inhibit the dissolution of manganese ions during the process of lithium de-intercalation while promoting the migration of lithium ions, thereby improving the rate performance, cycling performance, and safety performance of the secondary battery.

It should be pointed out that the positions of the main characteristic peaks of the of the positive electrode active material inner core in the present application are basically consistent with those of $LiMnPO_4$ before doping, indicating that the doped lithium manganese phosphate positive electrode active material inner core has no impurity phase, and the improvement of the performance of the secondary battery mainly results from doping with elements, rather than the impurity phase.

In some embodiments, optionally, the coating amount of the first coating layer is greater than 0 wt % and less than or equal to 7 wt %, optionally 4-5.6 wt %, based on the weight of the inner core.

When the coating amount of the first coating layer is within the above range, the dissolution of manganese ions may be further inhibited and at the same time the transport of lithium ions may be further promoted. Besides, the following situations may be effectively avoided: if the coating amount of the first coating layer is too small, the inhibition effect of the pyrophosphate on the dissolution of manganese ions may be insufficient and the improvement of the transport performance of lithium ions may also be insignificant; and if the coating amount of the first coating layer is too large, the coating layer may be too thick, which increases the impedance of the battery and affects the dynamic performance of the secondary battery.

In some embodiments, optionally, the coating amount of the second coating layer is greater than 0 wt % and less than or equal to 6 wt %, optionally 3-5 wt %, based on the weight of the inner core.

The carbon-containing layer as the second coating layer may play a role of a barrier to prevent the positive electrode active material from come into direct contact with the electrolyte solution, thereby reducing the corrosion of the positive electrode active material by the electrolyte solution and improving the safety performance of the secondary battery at a high temperature. In another aspect, the carbon-containing layer has a relatively strong electric conductivity and may reduce the internal resistance of the battery, thereby improving the dynamic performance of the secondary battery. However, since the gram capacity of the carbon material is relatively low, when the amount of the second coating layer is excessively large, the gram capacity of the positive electrode active material as a whole may be reduced. Therefore, when the coating amount of the second coating layer is within the above range, the dynamic performance and safety performance of the secondary battery are further improved without sacrificing the gram capacity of the positive electrode active material.

In some embodiments, optionally, the coating amount of the third coating layer is greater than 0 wt % and less than or equal to 10 wt %, optionally greater than 0 wt % and less than or equal to 5 wt %, further greater than 0 wt % and less than or equal to 2 wt %, based on the weight of the inner core with the first coating layer and the second coating layer.

When the coating amount of the third coating layer is within the above range, the coating modification effect thereof on the inner core is better, the dissolution of the manganese ions can be further inhibited, and at the same time the transport of lithium ions may be further promoted. Besides, the following situations may be effectively avoided: when the coating amount of the coating layer is too low, the effect of reducing the dissolution of manganese ions may not be obvious; and when the coating amount of the coating layer is too high, the impedance of the battery may be increased, thereby possibly affecting the rate performance, the cycling performance, etc., of the secondary battery.

In the inner core, x is −0.100 to 0.100, for example, x may be 0.006, 0.004, 0.003, 0.002, 0.001, 0, −0.001, −0.003, −0.004, −0.005, −0.006, −0.007, −0.008, −0.009, and −0.100.

In the inner core, y is 0.001 to 0.500, for example, y may be 0.1, 0.2, 0.25, 0.3, 0.35, 0.4, and 0.45.

In the inner core, z is 0.001 to 0.100, for example, z may be 0.001, 0.002, 0.003, 0.004, 0.005, 0.006, 0.007, 0.008, 0.009, and 0.100.

In some embodiments, optionally, in the inner core, the ratio of y to 1-y is 1:10 to 10:1, optionally 1:4 to 1:1. Here, y denotes the sum of the stoichiometric numbers of the Mn-site doping elements. When the above conditions are satisfied, the energy density and cycling performance of the secondary battery may be further improved.

In some embodiments, optionally, in the inner core, the ratio of z to 1-z is 1:9 to 1:999, optionally 1:499 to 1:249. Here, y denotes the sum of the stoichiometric numbers of the P-site doping elements. When the above conditions are satisfied, the energy density and cycling performance of the secondary battery may be further improved.

In some embodiments, optionally, A is selected from at least two of Fe, Ti, V, Ni, Co, and Mg.

The manganese site in the lithium manganese phosphate positive electrode active material is simultaneously doped with two or more of the above-mentioned elements, which is advantageous to enhance the doping effect. On one hand, the lattice change rate is further reduced, and thus, the dissolution of manganese ions is inhibited and the consumption of the electrolyte solution and the active lithium ion is reduced. On the other hand, the surface oxygen activity is further reduced, the interfacial side reactions between the positive electrode active material and the electrolyte solution are reduced, and thus, the cycling performance and high-temperature storage performance of the secondary battery are improved.

In some embodiments, optionally, the phosphate of the first coating layer has an interplanar spacing of 0.345-0.358 nm and an included angle of 24.25°-26.45° for crystal orientation (111).

In some embodiments, optionally, the pyrophosphate of the first coating layer has an interplanar spacing of 0.293-0.326 nm and an included angle of 26.41°-32.57° for crystal orientation (111).

When the interplanar spacings and the included angles of the crystal orientation (111) of the phosphate and pyrophosphate in the first coating layer are within the above ranges, the impurity phase in the coating layer may be effectively avoided and thus the gram capacity, the cycling performance, and the rate performance of the positive electrode active material are improved.

In some embodiments, optionally, the weight ratio of the pyrophosphate to the phosphate in the first coating layer is 1:3 to 3:1, optionally 1:3 to 1:1.

The proper ratio of the pyrophosphate to the phosphate is beneficial to give full play to the synergistic effect of the pyrophosphate and the phosphate. It can not only effectively hinder the dissolution of manganese ions, but can also effectively reduce the content of the lithium impurity on the surface and reduce interfacial side reactions, thereby improving the rate performance, the cycling performance, and the safety performance of the secondary battery. Besides, the following situations may be effectively avoided: if the pyrophosphate is too much and the phosphate is too little, the impedance of the battery may increase; and if the phosphate is too much and the pyrophosphate is too little, the effect of inhibiting the dissolution of manganese ions is insignificant.

In some embodiments, optionally, the pyrophosphate and the phosphate each independently have a crystallinity of 10% to 100%, optionally 50% to 100%.

In the first coating layer of the lithium manganese phosphate positive electrode active material, the pyrophosphate and phosphate with certain crystallinities are beneficial to keep the structure of the first coating layer stable and reduce lattice defects. This is beneficial to give full play to the effect of the pyrophosphate on inhibiting the dissolution of manganese ions and is also beneficial to reduce the content of the lithium impurity on the surface and the surface oxygen valence state by the phosphate, thereby reducing the interfacial side reactions between the positive electrode active material and the electrolyte solution, reducing the consumption of the electrolyte solution, and improving the cycling performance and the safety performance of the secondary battery.

It should be noted that in the present application, the crystallinity of the pyrophosphate and phosphate may be adjusted, for example, by adjusting the process conditions of the sintering process, such as the sintering temperature and the sintering time. The crystallinity of the pyrophosphate and phosphate may be measured by a method known in the art, such as by X-ray diffraction, density, infrared spectroscopy, differential scanning calorimetry, and nuclear magnetic resonance absorption methods.

In some embodiments, the polymer in the third coating layer comprises at least one structural units represented by formula 1,

formula 1

$R_1$ and $R_2$ each independently represent H or at least one of the group consisting of the following functional groups: —COOH, —OH, —SH, —CN, —SCN, amino, a phosphate group, a carboxylate group, acylamino, an aldehyde group, sulfonyl, a polyether chain segment, a C1-C20 aliphatic hydrocarbon group, a C1-C20 halogenated aliphatic hydrocarbon group, a C1-C20 heteroaliphatic hydrocarbon group, a C1-C20 halogenated heteroaliphatic hydrocarbon group, a C6-C20 aromatic hydrocarbon group, a C6-C20 halogenated aromatic hydrocarbon group, a C2-C20 heteroaromatic aromatic hydrocarbon group, and a C2-C20 halogenated heteroaromatic hydrocarbon group. Optionally, $R_1$ and $R_2$ each independently represent H or at least one of the group consisting of the following functional groups: —OH, —SH, amino, a phosphate group, a polyether chain segment, C1-C8 alkyl, C1-C8 halogenated alkyl, C1-C8 heteroalkyl, C1-C8 halogenated heteroalkyl, C2-C8 alkenyl, and C2-C8 halogenated alkenyl.

These functional groups can chelate manganese ions, reduce dissolution of manganese ions, simultaneously remove F-containing ions from an electrolyte solution, and further relieve corrosion of the surface of the positive electrode active material by an acidic substance in the electrolyte solution, thereby significantly improving the cycling performance of the secondary battery.

In some embodiments, the polysiloxane with a linear structure further comprises a capping group. Optionally, the capping group includes at least one selected from the group consisting of the following functional groups: a polyether, C1-C8 alkyl, C1-C8 halogenated alkyl, C1-C8 heteroalkyl, C1-C8 halogenated heteroalkyl, C2-C8 alkenyl, C2-C8 halogenated alkenyl, a C6-C20 aromatic hydrocarbon group, C1-C8 alkoxy, a C2-C8 epoxy group, hydroxyl, C1-C8 hydroxyalkyl, amino, C1-C8 aminoalkyl, carboxyl, and C1-C8 carb oxy alkyl.

By way of example, the polysiloxane with a linear structure includes, but is not limited to, one or more of polydimethylsiloxane, polydiethylsiloxane, polymethyl ethyl siloxane, polymethylvinylsiloxane, polyphenylmethylsiloxane, polymethylhydrogensiloxane, carboxy-functionalized polysiloxane, epoxy-terminated polysiloxane, methoxy-terminated polydimethylsiloxane, polymethylchloropropylsiloxane, thiopropyl polysiloxane, aminoethylaminopropyl polydimethylsiloxane, hydroxypropyl-terminated polysiloxane, hydroxyl-terminated polydimethylsiloxane, polyether-terminated polydimethylsiloxane, aminopropyl-pendant polysiloxane, aminopropyl-terminated polydimethylsiloxane, hydroxymethyl-pendant polysiloxane, hydroxypropyl-pendant polysiloxane, side-chain-polyether-grafted polydimethylsiloxane, and side-chain-phosphate-grafted polydimethylsiloxane.

Optionally, the polysiloxane with a linear structure includes one or more of hydroxyl-terminated polydimethylsiloxane, thiopropyl polysiloxane, aminoethylaminopropyl polydimethylsiloxane, side-chain-polyether-grafted polydimethylsiloxane, and side-chain-phosphate-grafted polydimethylsiloxane.

By way of example, the polysiloxane with a cyclic structure includes one or more of 1,3,5,7-octamethylcyclotetrasiloxane, 1,3,5,7-tetrahydro-1,3,5,7-tetramethylcyclotetrasiloxane, cyclopentadim ethylsiloxane, 2,4,6,8-tetramethylcyclotetrasiloxane, 2,4,6,8-tetramethyl-2,4,6,8-tetravinylcyclotetrasiloxane, cyclic polymethylvinylsiloxane, hexadecylmethylcyclooctasiloxane, tetradecamethylcylcycloheptasiloxane, and cyclic polydimethylsiloxane.

In some embodiments, the polymer is selected from a polysiloxane with a linear structure. Since the electrons in a ring of the polysiloxane with a cyclic structure have a certain delocalizability. Therefore, compared with the polysiloxane with a linear structure, an Si—O skeleton of the polysiloxane with a cyclic structure has a lower affinity for an electron-rich F-containing ion, thus has a slightly lower rate of removing the F-containing ions from an electrolyte solution, leading to a slightly lower effect on reducing the dissolution of manganese ions and a slightly poorer effect on improving the cycling performance of the secondary battery.

In some embodiments, the number-average molecular weight of the polymer is 300,000 or below, for example, may be 400 to 300,000, 400 to 200,000, 400 to 100,000, 400 to 80,000, 400 to 50,000, 400 to 20,000, 400 to 10,000, 1,000 to 100,000, 1,000 to 50,000, 1,000 to 20,000, and 1,000 to 10,000. The number-average molecular weight of the polymer may be determined by a method known in the art, for example, using gel permeation chromatography (GPC). The test instrument may be PL-GPC 220 high-temperature gel permeation chromatograph. In the present application, the "polymer" may be either a low polymer or a high polymer. The present application is not limited thereto.

When the number-average molecular weight of the polymer is within a proper range, the positive electrode active material may have both a good dynamic performance and a good high-temperature stability. Besides, the following situations may be effectively avoided: If the number-average molecular weight of the polymer is too small, the polymer may not have an obvious coating modification effect; and if the number-average molecular weight of the polymer is too large, the hydrophobicity thereof may be relatively strong, thereby possibly affecting the dynamic performance of the secondary battery and also possibly resulting in a poor coating modification effect.

In some embodiments, the mass percentage content of a polar functional group in the polysiloxane is a with $0 \leq \alpha \leq 50\%$, optionally $5\% \leq \alpha \leq 30\%$.

In the present application, "the mass percentage content of a polar functional group in the polysiloxane" means the mass proportions of the polar functional groups in $R_1$, $R_2$, and the capping group in the polysiloxane. In the present application, the polar functional group includes one or more of —COOH, —OH, —SH, —CN, —SCN, amino (including —NH$_2$ and —NH—), a phosphate group, a carboxylate group (—COO—), acylamino (—CONH—), an aldehyde group (—CHO), sulfonyl (—S(=O)$_2$—), a polyether chain segment, a halogen, alkoxy, and epoxy. When these above-mentioned polar functional groups are directly bonded to a silicon atom, α represents the mass fraction of the polar functional groups in the polysiloxane. When the polar functional groups are not directly bonded to the silicon atom, α represents the sum of the mass fractions of the polar functional groups and divalent to tetravalent methyl groups (e.g., —CH$_2$—, —CH—, —C—, etc.) directly bonded thereto in the polysiloxane, where the "divalent to tetravalent methyl groups" represent carbon atoms directly bonded to the polar functional groups and located between the polar functional groups and the silicon atom and other nonpolar functional groups bonded to the carbon atoms. Taking polymethyl trifluoropropyl siloxane as an example, α refers to the mass percentage content of —CF$_3$, exclusive of ethylidene therein; taking polymethyl chloropropyl siloxane as an example, α refers to the mass percentage content of —CH$_2$Cl, exclusive of ethylidene therein; and taking hydroxypropyl-terminated polydimethylsiloxane as an example, α refers to the mass percentage content of —CH$_2$OH. The mass percentage content of the polar functional groups in the polysiloxane may be determined by a method known in the art, for example, titration (e.g., acid-base titration, redox titration, and precipitation titration), infrared spectroscopy, and nuclear magnetic resonance spectroscopy methods.

When the content of the polar functional group in the polysiloxane is within a proper range, the coating modification effect on the inner core is better. Besides, the following situations may be effectively avoided: When the content of the polar functional group in the polysiloxane is too high, the function of removing F-containing ions from the electrolyte solution cannot be further improved, but the contact angle between the electrolyte solution and the positive electrode plate is possibly reduced. Therefore, the improvement effect on the cycling performance of the secondary battery is not obvious.

In some embodiments, optionally, the Li/Mn antisite defect concentration of the positive electrode active material is 4% or less, optionally 2% or less.

The Li/Mn antisite defect means that the positions of $Li^+$ and $Mn^{2+}$ are exchanged in the LiMnPO$_4$ lattice. The Li/Mn antisite defect concentration refers to the percentage of $Li^+$ exchanged with $Mn^{2+}$ relative to the total amount of the $Li^+$ in the positive electrode active material. Since the $Li^+$ transport channel is one-dimensional, $Mn^{2+}$ has difficulty in migrating in the $Li^+$ transport channel, and therefore, the transport of $Li^+$ is hindered by the $Mn^{2+}$ of the antisite defect. In the positive electrode active material of the present application, by controlling the Li/Mn antisite defect concentration at a low level, the gram capacity and rate performance of the positive electrode active material may be improved. In the present application, the antisite defect concentration may be measured, for example, in accordance with JIS K 0131-1996.

In some embodiments, optionally, the positive electrode active material has a lattice change rate of 6% or less, optionally 4% or less.

The process of lithium de-intercalation in LiMnPO$_4$ is a two-phase reaction. The interfacial stress of the two phases is determined by the lattice change rate. The smaller the lattice change rate, the smaller the interfacial stress and the easier the $Li^+$ transport. Therefore, reducing the lattice change rate of the inner core is beneficial to enhance the $Li^+$ transport capacity of, thereby improving the rate performance of the secondary battery.

In some embodiments, optionally, the average discharge voltage of a button battery of the positive electrode active material is 3.5 V or more and the discharge gram capacity is 140 mAh/g or more. Optionally, the average discharge voltage is 3.6 V or more and the discharge gram capacity is 145 mAh/g or more.

Although the average discharge voltage of undoped LiMnPO$_4$ is 4.0 V or more, the discharge gram capacity thereof is relatively low, typically less than 120 mAh/g. Therefore, the energy density of the secondary battery is relatively low. The discharge gram capacity thereof may be greatly improved by adjusting the lattice change rate through doping. The overall energy density of the secondary battery is obviously improved where the average discharge voltage is slightly reduced.

In some embodiments, optionally, the surface oxygen valence state of the positive electrode active material is −1.88 or less, optionally −1.98 to −1.88.

This is because the higher the valence state of oxygen in a compound, the stronger the electron-accepting ability thereof, that is, the stronger the oxidability. In the lithium manganese phosphate positive electrode active material of the present application, by controlling the surface oxygen valence state at a relatively low level, the surface reactivity of the positive electrode active material may be reduced, and the interfacial side reactions between the positive electrode active material and the electrolyte solution may be reduced, thereby improving the cycling performance and the high-temperature storage performance of the secondary battery.

In some embodiments, optionally, the compacted density of the positive electrode active material under 3 tons is 2.0 g/cm$^3$ or more, optionally 2.2 g/cm$^3$ or more.

The higher the compacted density of the positive electrode active material, i.e., the higher the weight of the active material per unit volume, the more conducive to improving the volumetric energy density of the secondary battery. In the present application, the compacted density may be determined, for example, in accordance with GB/T 24533-2009.

Preparation Method

A second aspect of the present application provides a method for preparing the positive electrode active material of the first aspect of the present application, comprising the following steps:
a step of providing an inner core material, wherein: the inner core comprises $Li_{1+x}Mn_{1-y}A_yP_{1-z}R_zO_4$, wherein x is −0.100 to 0.100, y is 0.001 to 0.500, z is 0.001 to 0.100, A is one or more selected from Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S;
a coating step, involving: providing an $MP_2O_7$ powder and an $XPO_4$ suspension containing a carbon source, adding the inner core material and the $MP_2O_7$ powder into the $XPO_4$ suspension containing the carbon source, mixing same, sintering the mixture to obtain an inner core with a first coating layer and a second coating layer, and coating the obtained inner core with the first coating layer and the second coating layer with a polymer by dry coating or wet coating to obtain a positive electrode active material, wherein the polymer comprises one or more selected from a polysiloxane with a linear structure and a polysiloxane with a cyclic structure, and M and X are each independently selected from one or more of Li, Fe, Ni, Mg, Co, Cu, Zn, Ti, Ag, Zr, Nb, and Al, and
the positive electrode active material has a core-shell structure, comprising the inner core and a shell coating the inner core, with the shell comprising the first coating layer coating the inner core, the second coating layer coating the first coating layer, and the third coating layer coating the second coating layer, wherein the first coating layer comprises a pyrophosphate of $MP_2O_7$ and a phosphate of $XPO_4$, the second coating layer comprises carbon, the third coating layer comprises the polymer, and the polymer comprises one or more selected from the polysiloxane with a linear structure and the polysiloxane with a cyclic structure.

The preparation method of the present application is not particularly limited with respect to the material source. Optionally, the inner core material in the preparation method of the present application may be commercially available or may also be prepared by the method of the present application. Optionally, the inner core material is prepared by the method described below.

In some embodiments, optionally, the step of providing the inner core material comprises the following steps:
step (1): mixing and stirring a manganese source, an element A source, and an acid in a container to obtain manganese salt particles doped with element A; and
step (2): mixing the manganese salt particles doped with element A with a lithium source, a phosphorus source, and an element R source in a solvent to obtain a slurry, and sintering the slurry under inert gas atmosphere protection to obtain lithium manganese phosphate doped with element A and element R, wherein the lithium manganese phosphate doped with element A and element R is $Li_{1+x}Mn_{1-y}A_yP_{1-z}R_zO_4$, where x is −0.100 to 0.100, y is 0.001 to 0.500, z is 0.001 to 0.100, A is selected from one or more of Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S.

In some embodiments, optionally, step (1) is performed at a temperature of 20-120° C., optionally 25-80° C.

In some embodiments, the stirring in step (1) is performed at 500-700 rpm for 60-420 minutes, optionally for 120-360 minutes.

By controlling the reaction temperature, the stirring speed, and the mixing time during doping, the doping elements may be uniformly distributed, lattice defects may be reduced, the dissolution of manganese ions is inhibited, and the interfacial side reactions between the positive electrode active material and the electrolyte solution may be reduced, thereby improving the gram capacity, rate performance, etc., of the positive electrode active material.

It should be noted that in the present application, the source of an element may include one or more of an elementary substance, a sulfate, a halide, a nitrate, an organic acid salt, an oxide or a hydroxide of the element, provided that the source can achieve the purpose of the preparation method of the present application. By way of example, the element A source is selected from one or more of an elementary substance, a sulfate, a halide, a nitrate, an organic acid salt, an oxide or a hydroxide of element A; and/or the element R source is selected from one or more of an elementary substance, a sulfate, a halide, a nitrate, an organic acid salt, an oxide or a hydroxide of element R and an inorganic acid of element R.

In some embodiments, optionally, the manganese source in the present application is selected from one or more of elemental manganese, manganese dioxide, manganese phosphate, manganese oxalate, and manganese carbonate.

In some embodiments, optionally, element A is iron, and optionally, the iron source is selected from one or more of ferrous carbonate, ferric hydroxide, and ferrous sulfate.

In some embodiments, optionally, in step (1), the acid is selected from one or more of hydrochloric acid, sulfuric acid, nitric acid, phosphoric acid, an organic acid like oxalic acid, etc., optionally oxalic acid. In some embodiments, the acid is a dilute acid with a concentration of 60 wt % or less.

In some embodiments, optionally, the inorganic acid of element R is selected from one or more of phosphoric acid, nitric acid, boric acid, metasilicic acid, and orthosilicic acid.

In some embodiments, optionally, the lithium source in the present application is selected from one or more of lithium carbonate, lithium hydroxide, lithium phosphate, and lithium dihydrogen phosphate.

In some embodiments, optionally, the phosphorus source in the present application is selected from one or more of diammonium hydrogen phosphate, ammonium dihydrogen phosphate, ammonium phosphate, and phosphoric acid.

In some embodiments, optionally, the carbon source in the present application is an organic carbon source, and the organic carbon source is selected from one or more of starch, sucrose, glucose, polyvinyl alcohol, polyethylene glycol, and citric acid.

In some embodiments, optionally, the solvent used in the preparation method of the present application is a solvent commonly used in the art. For example, the solvent in the preparation method of the present application may be each independently selected from at least one of ethanol and water (e.g., deionized water).

In some embodiments, optionally, during the preparation of manganese salt particles doped with element A, the pH of the solution is controlled to be 4-6. It should be noted that the pH of the obtained mixture may be adjusted in the present application by a method commonly used in the art, for example by adding an acid or a base.

In some embodiments, optionally, in step (2), the molar ratio of the manganese salt particles doped with element A, the lithium source, and the phosphorus source is 1:(0.5-2.1):(0.5-2.1).

In some embodiments, optionally, in step (2), the sintering conditions are: sintering at 600-800° C. for 4-10 hours in an atmosphere of an inert gas or of an inert gas mixed with hydrogen. Therefore, the sintered material has a higher crystallinity and can thus improve the gram capacity, rate performance, etc., of the positive electrode active material.

In some embodiments, optionally, the mixture of the inert gas and hydrogen is nitrogen (70-90 vol %)+hydrogen (10-30 vol %).

In some embodiments, optionally, the $MP_2O_7$ powder is a commercially available product, or optionally, the $MP_2O_7$ powder is prepared by the following method: adding an element M source and a phosphorus source to a solvent to obtain a mixture, adjusting the pH of the mixture to 4-6, stirring and fully reacting the mixture, and then drying and sintering the reaction product to obtain the powder, wherein M is selected from one or more of Li, Fe, Ni, Mg, Co, Cu, Zn, Ti, Ag, Zr, Nb, or Al.

In some embodiments, optionally, during the preparation of the $MP_2O_7$ powder, the drying is performed at 100-300° C., optionally 150-200° C. for 4-8 hours.

In some embodiments, optionally, during the preparation of the $MP_2O_7$ powder, the sintering is performed at 500-800° C., optionally 650-800° C., in an inert gas atmosphere for 4-10 hours.

In some embodiments, optionally, the $XPO_4$ suspension comprising a carbon source is commercially available, or optionally, prepared by the following method: uniformly mixing a lithium source, an X source, a phosphorus source, and a carbon source in a solvent, then heating the reaction mixture to 60-120° C., and maintaining the temperature for 2-8 hours to obtain an $XPO_4$ suspension containing a carbon source. Optionally, during the process of preparing the $XPO_4$ suspension containing a carbon source, the pH of the mixture is adjusted to 4-6.

In some embodiments, optionally, in the coating step, the mass ratio of the lithium manganese phosphate doped with elements A and R (inner core), the $MP_2O_7$ powder, and the $XPO_4$ suspension containing a carbon source is 1:(0.001-0.05):(0.001-0.05).

In some embodiments, optionally, in the coating step, when obtaining the inner core with the first coating layer and the second coating layer, the sintering temperature is 500-800° C., and the sintering time is 4-10 hours.

In some embodiments, the positive electrode active material prepared by dry coating in the coating step may be obtained by uniformly mixing the inner core with the first coating layer and the second coating layer with a polymer using a mixer to form a mixed powder body, and then sintering the mixed powder in a sintering furnace in a nitrogen or inert gas atmosphere. The sintering may be performed at a temperature in a range of 200-300° C. for 4-10 hours. Optionally, the sintering is performed at about 200° C., about 250° C. or about 300° C. for about 4 hours, about 6 hours, about 8 hours or about 10 hours. Optionally, the sintering temperature and the sintering time may be in any range of any of the above-mentioned numerical values.

By controlling the sintering temperature and time within the above ranges, the following situations may be avoided: when the sintering temperature is too low or the sintering time is too short, the bonding of the third coating layer and the second coating layer may be insufficient; and when the sintering temperature is too high or the sintering time is too long, the third coating layer may be carbonized and may not function to remove F-containing ions contained in the electrolyte solution.

In some embodiments, the positive electrode active material prepared by wet coating in the coating step may be obtained by dissolving a polymer in a solvent to form a coating solution, then adding the inner core with a first coating layer and a second coating layer to the coating solution, stirring same to form a mixed slurry, then placing the mixed slurry in a wet-coating machine, and stirring while drying same in a nitrogen or inert gas atmosphere. The drying may be performed at a temperature in a range of 100° C. to 200° C., optionally 110° C. to 190° C., more optionally 120° C. to 180° C., even more optionally 120° C. to 170° C., most optionally 120° C. to 160° C., for a time of 3-9 hours, optionally 4-8 hours, more optionally 5-7 hours, and most optionally about 6 hours.

In some embodiments, optionally, primary particles of the lithium manganese phosphate positive electrode active material coated with three layers in the present application have a median particle size Dv50 of 50-2,000 nm.

Positive Electrode Plate

A third aspect of the present application provides a positive electrode plate, comprising a positive electrode current collector and a positive electrode film layer arranged on at least one surface of the positive electrode current collector, wherein the positive electrode film layer comprises the positive electrode active material of the first aspect of the present application or a positive electrode active material prepared by the method of the second aspect of the present application, and the content of the positive electrode active material in the positive electrode film layer is 10 wt % or more, based on the total weight of the positive electrode film layer.

The positive electrode current collector has two opposite surfaces in the thickness direction thereof and the positive electrode film layer is arranged on either or both of the two opposite surfaces of the positive electrode current collector.

In some embodiments, the content of the positive electrode active material in the positive electrode film layer is 90-99.5 wt %, based on the total weight of the positive electrode film layer. When the content of the positive electrode active material is within the above range, it is advantageous to fully exert the advantages of the positive electrode active material of the present application.

The positive electrode film layer does not exclude other positive electrode active materials than the positive electrode active material of the first aspect of the present application or a positive electrode active material prepared by the method of the second aspect of the present application, for example, the positive electrode film layer may further comprise at least one of a lithium transition metal oxide and a modified compound thereof. By way of example, the other positive electrode active materials may comprise at least one of lithium cobalt oxide, lithium nickel oxide, lithium manganese oxide, lithium nickel cobalt oxide, lithium manganese cobalt oxide, lithium nickel manganese oxide, lithium nickel cobalt manganese oxide, lithium nickel cobalt aluminum oxide, and a modified compound thereof.

In some embodiments, the positive electrode film layer further optionally comprises a positive electrode conductive agent. In the present application, the type of the positive electrode conductive agent is not particularly limited. By way of example, the positive electrode conductive agent includes at least one of superconducting carbon, conductive graphite, acetylene black, carbon black, Ketjen black, carbon dots, carbon nanotubes, graphene, and carbon nanofibers.

In some embodiments, the positive electrode film layer further optionally comprises a positive electrode binder. In the present application, the type of the positive electrode binder is not particularly limited. By way of example, the positive electrode binder may include at least one of polyvinylidene fluoride (PVDF), polytetrafluoroethylene (PTFE), a vinylidene fluoride-tetrafluoroethylene-propylene terpolymer, a vinylidene fluoride-hexafluoropropylene-tetrafluoroethylene terpolymer, a tetrafluoroethylene-hexafluoropropylene copolymer, and a fluorinated acrylate resin.

In some embodiments, the positive electrode current collector may be a metal foil or a composite current collector. As an example of the metal foil, an aluminum foil may be used. The composite current collector may comprise a polymer material base layer and a metal material layer formed on at least one surface of the polymer material base layer. By way of example, the metal material may be selected from at least one of aluminum, an aluminum alloy, nickel, a nickel alloy, titanium, a titanium alloy, silver, and a silver alloy. By way of example, the polymer material base layer may be selected from polypropylene (PP), polyethylene terephthalate (PET), polybutylene terephthalate (PBT), polystyrene (PS), polystyrene ethylene (PE), etc.

In some embodiments, the solid-liquid contact angle between the positive electrode film layer and a non-aqueous organic solvent is between 3° and 90°, optionally between 3° and 60°, further between 10° and 30°. When the contact angle is within a proper range, the secondary battery may have both a higher energy density and a good rate performance, cycling performance and safety performance. Besides, the following situations may be effectively avoided: if the contact angle is too small, the polymer may not well play the role of coating modification, and the role thereof in improving the cycling performance may not be obvious; and if the contact angle is too large, the wettability of the electrolyte solution on the positive electrode film layer may deteriorate, which may affect the rate performance, cycling performance, etc., of the secondary battery. The solid-liquid contact angle between the positive electrode film layer and the non-aqueous organic solvent has a meaning that is well known in the art, and may be measured by a method known in the art, for example, by reference to GBT 30693-2014. An exemplary test method comprises the following steps: at a room temperature, dripping a non-aqueous organic solvent onto the surface of the positive electrode plate, and testing the contact angle of the positive electrode plate within 60 seconds by means of a contact angle testing instrument. The testing instrument may be model LSA 200 optical contact angle measuring instrument from LAUDA Scientific, Germany. The non-aqueous organic solvent may be a non-aqueous electrolyte solution well known in the art for a secondary battery. Optionally, the non-aqueous organic solvent may be ethylene carbonate (EC).

In some embodiments, the positive electrode film layer has a porosity of 15% to 50%, optionally 15% to 30%. When the porosity is within a proper range, the secondary battery may have both a higher energy density and a good rate performance, cycling performance and safety performance. Besides, the following situations may be effectively avoided: if the porosity is too small, the wettability of the electrolyte solution on the positive electrode film layer may deteriorate, which may affect the rate performance, cycling performance, etc., of the secondary battery; and if the porosity is too large, the overall energy density of the secondary battery may be affected. The porosity of the positive electrode film layer has a meaning well known in the art, and may be tested by a method known in the art, for example, by reference to GB/T 24586-2009.

The positive electrode film layer is usually formed by applying a positive electrode slurry to a positive electrode current collector, and drying and cold-pressing same. The positive electrode slurry is usually formed by dispersing the positive electrode active material, an optional conductive agent, an optional binder, and any other components in a solvent, and stirring same uniformly. The solvent may be N-methylpyrrolidone (NMP), but is not limited thereto.

It should be noted that each of the positive electrode film layer parameters (e.g., contact angle and porosity) given in the present application refers to a parameter of the positive electrode film layer on a single side of the positive electrode current collector. When the positive electrode film layer is arranged on both sides of the positive electrode current collector, the parameters of the positive electrode film layer on either side satisfying the present application are deemed to fall within the scope of protection of the present application.

In addition, the test on each parameter of the positive electrode film layer may be performed by sampling during the preparation of the electrode plate or the battery, or may also be performed by sampling from the manufactured battery.

When the above test samples are taken from the manufactured battery, for example, the sampling may be performed by the following steps: discharging the battery (for safety, the battery is generally in a full-discharge state); disassembling the battery, then taking out the positive electrode plate, and soaking the positive electrode plate in dimethyl carbonate (DMC) for a period of time (e.g., 2-10 h); and then taking out the positive electrode plate and drying the positive electrode plate at a certain temperature for a certain period of time (for example, at 60° C. for 4 hours), and after drying, taking out the positive electrode plate; and at this time, performing sampling on the dried positive electrode plate to test each of the above-mentioned parameters in the present application related to the positive electrode film layer in the dried positive electrode plate.

Secondary Battery

A fourth aspect of the present application provides a secondary battery, comprising the positive electrode plate of the third aspect of the present application.

A secondary battery, also known as a rechargeable battery or an accumulator, refers to a battery of which an active material can be activated by means of charging for reuse after the battery is discharged. Generally, the secondary battery comprises an electrode assembly and an electrolyte, wherein the electrode assembly comprises a positive electrode plate, a negative electrode plate, and a separator. The separator is arranged between the positive electrode plate and the negative electrode plate, and mainly play a role of preventing the positive and negative electrodes from short-circuiting and enabling active ions to pass through. The electrolyte functions to conduct active ions between the positive electrode plate and the negative electrode plate.

Positive Electrode Plate

The positive electrode plate used in the secondary battery of the present application is the positive electrode plate according to any example of the third aspect of the present application.

Negative Electrode Plate

In some embodiments, the negative electrode plate comprises a negative electrode current collector and a negative electrode film layer arranged on at least one surface of the negative electrode current collector and comprising a negative electrode active material. For example, the negative electrode current collector has two opposite surfaces in the thickness direction thereof, and the negative electrode film layer is arranged on either or both of the two opposite surfaces of the negative electrode current collector.

The negative electrode active material may be a negative electrode active material well known in the art for secondary batteries. By way of example, the negative electrode active material includes but is not limited to at least one of natural graphite, artificial graphite, soft carbon, hard carbon, a silicon-based material, a tin-based material, and lithium titanate. The silicon-based material may include at least one of elemental silicon, silicon oxide, a silicon carbon composite, a silicon nitrogen composite, and a silicon alloy material. The tin-based material may include at least one of elemental tin, a tin oxide, and a tin alloy material. The present application is not limited to these materials, and other well-known traditional materials that can be used as negative electrode active materials for secondary batteries may also be used. These negative electrode active materials may be used alone or as a combination of two or more.

In some embodiments, the negative electrode film layer further optionally comprises a negative electrode conductive agent. In the present application, the type of the negative electrode conductive agent is not particularly limited. By way of example, the negative electrode conductive agent may include at least one of superconducting carbon, conductive graphite, acetylene black, carbon black, Ketjen black, carbon dots, carbon nanotubes, graphene, and carbon nanofibers.

In some embodiments, the negative electrode film layer further optionally comprises a negative electrode binder. In the present application, the type of the negative electrode binder is not particularly limited. By way of example, the negative electrode binder may include at least one of styrene-butadiene rubber (SBR), water-soluble unsaturated resin SR-1B, an aqueous acrylic resin (for example, polyacrylic acid (PAA), polymethacrylic acid (PMAA), and sodium polyacrylate (PAAS)), polyacrylamide (PAM), polyvinyl alcohol (PVA), sodium alginate (SA), and carboxymethyl chitosan (CMCS).

In some embodiments, the negative electrode film layer further optionally comprises additional auxiliary agents. By way of example, these additional auxiliary agents may include a thickening agent, for example, sodium carboxymethyl cellulose (CMC) and a PTC thermistor material.

In some embodiments, the negative electrode current collector may be a metal foil or a composite current collector. As an example of the metal foil, a copper foil may be used. The composite current collector may comprise a polymer material base layer and a metal material layer formed on at least one surface of the polymer material base layer. By way of example, the metal material may be at least one of copper, a copper alloy, nickel, a nickel alloy, titanium, a titanium alloy, silver, and a silver alloy. By way of example, the polymer material base layer may be selected from polypropylene (PP), polyethylene terephthalate (PET), polybutylene terephthalate (PBT), polystyrene (PS), polystyrene ethylene (PE), etc.

The negative electrode film layer is usually formed by applying a negative electrode slurry to a negative electrode current collector, and drying and cold-pressing same. The negative electrode slurry is generally formed by dispersing a negative electrode active material, an optional conductive agent, an optional binder, and other optional auxiliary agents into a solvent and uniformly stirring same. The solvent may be N-methylpyrrolidone (NMP) or deionized water, but is not limited thereto.

The negative electrode plate exclude other additional functional layers in addition to the negative electrode film layer. For example, in some examples, the negative electrode plate of the present application further comprises a conductive primer (e.g., composed of a conductive agent and a binder) sandwiched between the negative electrode current collector and the negative electrode film layer and arranged on the surface of the negative electrode current collector. In some other examples, the negative electrode plate of the present application further comprises a protective layer covering the surface of the negative electrode film layer.

Electrolyte

The type of the electrolyte is not specifically limited in the present application and may be selected according to actual requirements. For example, the electrolyte may be selected from at least one of a solid electrolyte and a liquid electrolyte (i.e., an electrolyte solution).

In some embodiments, an electrolyte solution is used as the electrolyte and comprises an electrolyte salt and a solvent.

The type of the electrolyte salt is not specifically limited and may be selected according to actual requirements. In some embodiments, by way of example, the electrolyte salt may include at least one of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bisfluorosulfonimide (LiFSI), lithium bistrifluoromethanesulfonimide (LiTFSI), lithium trifluoromethanesulfonate (LiTFS), lithium difluoro(oxalato)borate (LiDFOB), lithium bis(oxalato)borate (LiBOB), lithium difluorophosphate (LiPO$_2$F$_2$), lithium bisoxalatodifluorophosphate (LiDFOP), and lithium tetrafluorooxalatophosphate (LiTFOP).

The type of the solvent is not specifically limited and may be selected according to actual requirements. In some embodiments, by way of example, the solvent may include at least one of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), ethyl methyl sulfone (EMS), and diethyl sulfone (ESE).

In some embodiments, the electrolyte solution further optionally comprises an additive. For example, the additive may comprise a negative electrode film-forming additive, or may also comprise a positive electrode film-forming additive, or may also comprise an additive that may improve certain properties of a battery, such as an additive that improves the overcharge performance of a battery, an additive that improves the high-temperature performance of a battery, and an additive that improves the low-temperature power performance of a battery.

Separator

Secondary batteries using an electrolyte solution and some secondary batteries using a solid electrolyte further comprise a separator. The separator is arranged between the positive electrode plate and the negative electrode plate, and mainly play a role of preventing the positive and negative electrodes from short-circuiting and enabling active ions to pass through. The type of the separator is not particularly limited in the present application, and any well known porous-structured separator with good chemical stability and mechanical stability may be selected.

In some embodiments, the material of the separator may include at least one of glass fibers, non-woven fabrics, polyethylene, polypropylene, and polyvinylidene fluoride. The separator may be either a single-layer thin film or a multi-layer composite thin film. When the separator is a multi-layer composite thin film, the materials of the respective layers are the same or different.

In some embodiments, the positive electrode plate, the separator, and the negative electrode plate may be formed into an electrode assembly by a winding process or a stacking process.

In some embodiments, the secondary battery may comprise an outer package. The outer package may be used to encapsulate the above-mentioned electrode assembly and electrolyte.

In some embodiments, the outer package of the secondary battery may be a hard shell, for example, a hard plastic shell, an aluminum shell, or a steel shell. The outer package of the secondary battery may also be a soft bag, such as a pouch-type soft bag. The material of the soft bag may be a plastic, such as at least one of polypropylene (PP), polybutylene terephthalate (PBT), polybutylene succinate (PBS), etc.

The shape of the secondary battery is not particularly limited in the present application and may be cylindrical, square or of any other shape. FIG. 1 shows a secondary battery 5 with a square structure as an example.

Figure 2:
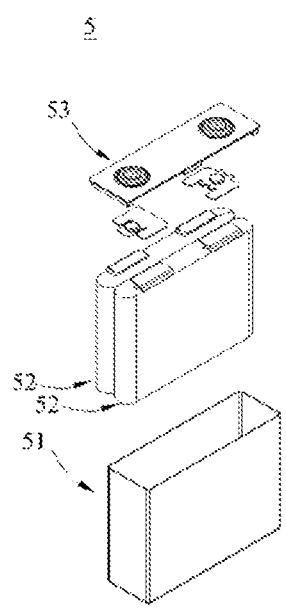
FIG. 2 is an exploded schematic diagram of an embodiment of the secondary battery shown in FIG. 1.

In some embodiments, as shown in FIG. 2, the outer package may comprise a housing 51 and a cover plate 53. The housing 51 may comprise a bottom plate and side plates connected to the bottom plate, and the bottom plate and the side plates are enclosed to form an accommodating cavity. The housing 51 has an opening in communication with the accommodating cavity, and the cover plate 53 is used for covering the opening to close the accommodating cavity. The positive electrode plate, the negative electrode plate, and the separator may be subjected to a winding process or a stacking process to form an electrode assembly 52. The electrode assembly 52 is packaged in the accommodating cavity. The electrolyte solution infiltrates the electrode assembly 52. The number of the electrode assemblies 52 contained in the secondary battery 5 may be one or more and may be adjusted according to requirements.

The method for preparing the secondary battery of the present application is well-known. In some embodiments, the positive electrode plate, the separator, the negative electrode plate, and the electrolyte solution may be assembled to form a secondary battery. By way of example, the positive electrode plate, the separator, and the negative electrode plate may be formed into an electrode assembly by a winding process or a stacking process, the electrode assembly is placed in an outer package and dried, an electrolyte solution is then injected, and the electrode assembly is subjected to procedures such as vacuum packaging, standing, forming, and shaping to obtain a secondary battery.

In some examples of the present application, the secondary battery according to the present application may be assembled into a battery module, the number of the secondary batteries contained in the battery module may be multiple, and the specific number may be adjusted according to the application and capacity of the battery module.

Figure 3:
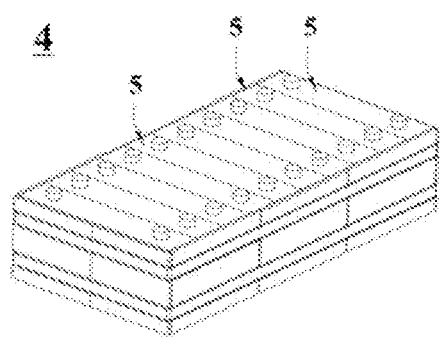
FIG. 3 is a schematic diagram of an embodiment of the battery module of the present application.

FIG. 3 shows a schematic diagram of a battery module 4 as an example. As shown in FIG. 3, in the battery module 4, a plurality of secondary batteries 5 may be arranged in sequence along the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above battery module may also be assembled into a battery pack, and the number of the battery modules contained in the battery pack may be adjusted according to the application and capacity of the battery pack.

Figure 4:
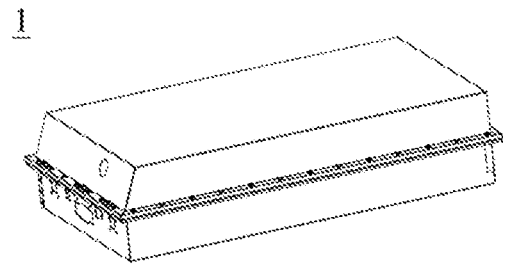
FIG. 4 is a schematic diagram of an embodiment of the battery pack of the present application.
Figure 5:
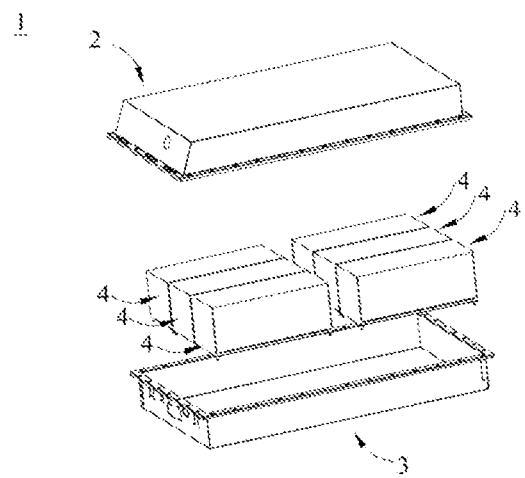
FIG. 5 is an exploded schematic diagram of the embodiment of the battery pack shown in FIG. 4.

FIGS. 4 and 5 show a schematic diagram of a battery pack 1 as an example. As shown in FIGS. 4 and 5, the battery pack 1 may comprise a battery case and a plurality of battery modules 4 arranged in the battery case. The battery case comprises an upper case body 2 and a lower case body 3, and the upper case body 2 is used to cover the lower case body 3 to form a closed space for accommodating the battery modules 4. A plurality of the battery modules 4 may be arranged in the battery case in any manner.

Power Consuming Device

A fifth aspect of the present application provides a power consuming device.

The power consuming device comprises at least one of the secondary battery, the battery module, or the battery pack provided by the present application. The secondary battery, the battery module or the battery pack may be used as a power supply of the power consuming device or as an energy storage unit of the power consuming device. The power consuming device may be, but is not limited to, a mobile device (e.g., a mobile phone, and a laptop computer), an electric vehicle (e.g., a pure electric vehicle, a hybrid electric vehicle, a plug-in hybrid electric vehicle, an electric bicycle, an electric scooter, an electric golf cart, and an electric truck), an electric train, a ship and a satellite, an energy storage system, etc.

A secondary battery, battery module or battery pack may be used for the power consuming device according to the usage requirements thereof.

Figure 6:
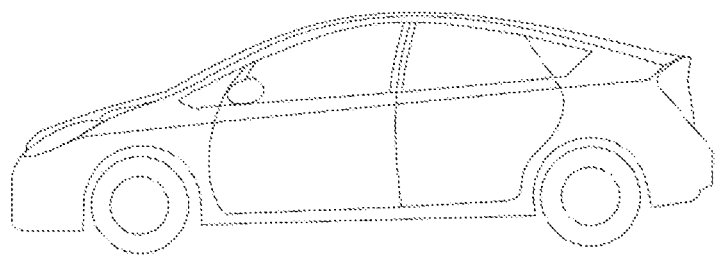
FIG. 6 is a schematic diagram of an embodiment of a power consuming device comprising the secondary battery of the present application as a power supply.

FIG. 6 shows a schematic diagram of a power consuming device as an example. The power consuming device may be a pure electric vehicle, a hybrid electric vehicle, a plug-in hybrid electric vehicle, etc. In order to meet the requirements of the power consuming device for a high power and a high energy density, a battery pack or battery module may be used.

As another example, the power consuming device may be a mobile phone, a tablet computer, a laptop computer, etc. The power consuming device is generally required to be thin and light, and may have a secondary battery used as a power supply.

EXAMPLES

The following examples more specifically describe the content disclosed in the present application, and these examples are only used for explanatory description, because various modifications and transitions within the scope of the present disclosure are obvious to those skilled in the art. Unless otherwise stated, all the parts, percentages, and ratios reported in the following examples are on a mass basis, and all the reagents used in the examples are commercially available, obtained by synthesis through a conventional method, and used directly without further treatment, and the instruments used in the examples are commercially available.

The sources of the raw materials involved in the examples of the present application are as follows:

| Name | Chemical formula | Manufacturer | Specification |
|---|---|---|---|
| Manganese carbonate | $MnCO_3$ | Shandong Xiya Chemical Industry Co., Ltd. | 1 Kg |
| Lithium carbonate | $Li_2CO_3$ | Shandong Xiya Chemical Industry Co., Ltd. | 1 Kg |
| Magnesium carbonate | $MgCO_3$ | Shandong Xiya Chemical Industry Co., Ltd. | 1 Kg |
| Zinc carbonate | $ZnCO_3$ | Wuhan Xinru Chemical Co., Ltd. | 25 Kg |
| Ferrous carbonate | $FeCO_3$ | Xi'an Lanzhiguang Fine Materials Co., Ltd. | 1 Kg |
| Nickel sulfate | $NiCO_3$ | Shandong Xiya Chemical Industry Co., Ltd. | 1 Kg |
| Titanium sulfate | $Ti(SO_4)_2$ | Shandong Xiya Chemical Industry Co., Ltd. | 1 Kg |
| Cobalt sulfate | $CoSO_4$ | Xiamen Zhixin Chemical Co., Ltd. | 500 g |
| Vanadium dichloride | $VCl_2$ | Shanghai Jinjinle Industrial Co., Ltd. | 1 Kg |
| Oxalic acid dihydrate | $C_2H_2O_4 \cdot 2H_2O$ | Shanghai Jinjinle Industrial Co., Ltd. | 1 Kg |
| Ammonium dihydrogen phosphate | $NH_4H_2PO_4$ | Shanghai Chengshao Biotechnology Co., Ltd. | 500 g |
| Sucrose | $C_{12}H_{22}O_{11}$ | Shanghai Yuanye Biotechnology Co., Ltd. | 100 g |
| Sulfuric acid | $H_2SO_4$ | Shenzhen Hisian Biotechnology Co., Ltd. | Mass fraction 60% |
| Nitric acid | $HNO_3$ | Anhui Lingtian Fine Chemical Co., Ltd. | Mass fraction 60% |
| Metasilicic acid | $H_2SiO_3$ | Shanghai Yuanye Biotechnology Co., Ltd | 100 g |
| Boronic acid | $H_3BO_3$ | Changzhou Qidi Chemical Co., Ltd. | 1 Kg |

Example 1-1

Preparation of Positive Electrode Active Material (1) Preparation of Co-Doped Lithium Manganese Phosphate Inner Core Preparation of Fe, Co and V co-doped manganese oxalate: 689.5 g of manganese carbonate (as $MnCO_3$, the same below), 455.2 g of ferrous carbonate (as $FeCO_3$, the same below), 4.6 g of cobalt sulfate (as $CoSO_4$, the same below), and 4.9 g of vanadium dichloride (as $VCl_2$, the same below) were mixed thoroughly for 6 hours in a mixer. The mixture was transferred to a reaction kettle, and 5 L of deionized water and 1260.6 g of oxalic acid dihydrate (as $C_2H_2O_4 \cdot 2H_2O$, the same below) were added. The reaction kettle was heated to 80° C., stirring was performed at a rotation speed of 600 rpm for 6 hours until the reaction was completed (no bubbles were generated) to obtain an Fe, Co, V and S co-doped manganese oxalate suspension. Then, the suspension was filtered, and the resulting filter cake was dried at 120° C. and then ground to obtain Fe, Co and V co-doped manganese oxalate dihydrate particles with a median particle size Dv50 of 100 nm.

Preparation of Fe, Co, V and S co-doped lithium manganese phosphate: the manganese oxalate dihydrate particles (1793.4 g) obtained in the previous step, 369.0 g of lithium carbonate (as $Li_2CO_3$, the same below), 1.6 g of 60% dilute sulfuric acid (as 60% $H_2SO_4$, the same below), and 1148.9 g of ammonium dihydrogen phosphate (as $NH_4H_2PO_4$, the same below) were added to 20 L of deionized water, and the mixture was stirred for 10 hours until mixed uniform, so as to obtain a slurry. The slurry was transferred to a spray drying device for spray-drying granulation at a set drying temperature of 250° C. for 4 hours to obtain a powder. The above powder was sintered at 700° C. for 4 hours in a protective atmosphere of nitrogen (90 vol %)+hydrogen (10 vol %) to obtain 1572.1 g of Fe, Co, V and S co-doped lithium manganese phosphate, that is, an inner core.

(2) Preparation of Lithium Iron Pyrophosphate and Lithium Iron Phosphate

Preparation of lithium iron pyrophosphate powder: 4.77 g of lithium carbonate, 7.47 g of ferrous carbonate, 14.84 g of ammonium dihydrogen phosphate, and 1.3 g of oxalic acid dihydrate were dissolved in 50 mL of deionized water. The pH of the mixture was 5, and stirring was performed for 2 hours such that the reaction mixture was fully reacted. Then, the reacted solution was heated to 80° C. and maintained at this temperature for 4 hours to obtain a suspension of $Li_2FeP_2O_7$, and the suspension was filtered, washed with deionized water, and dried at 120° C. for 4 hours to obtain a powder. The powder was sintered at 650° C. in a nitrogen atmosphere for 8 hours, naturally cooled to room temperature, and then ground to obtain an $Li_2FeP_2O_7$ powder.

Preparation of lithium iron phosphate suspension: 11.1 g of lithium carbonate, 34.8 g of ferrous carbonate, 34.5 g of ammonium dihydrogen phosphate, 1.3 g of oxalic acid dihydrate, and 74.6 g of sucrose (as $C_{12}H_{22}O_{11}$, the same below) were dissolved in 150 mL of deionized water to obtain a mixture, and stirring was then performed for 6 hours such that the mixture was fully reacted. Then, the reacted solution was heated to 120° C. and maintained at this temperature for 6 hours to obtain a suspension of $LiFePO_4$.

(3) Coating 1572.1 g of the above Fe, Co, V and S co-doped lithium manganese phosphate (inner core) and 15.72 g of the above lithium iron pyrophosphate ($Li_2FeP_2O_7$) powder were added to the suspension of lithium iron phosphate ($LiFePO_4$) prepared in the previous step, stirred and uniformly mixed, and the mixture was then transferred to a vacuum oven and dried at 150° C. for 6 hours. The resulting product was then dispersed by sanding. After dispersion, the obtained product was sintered at 700° C. in a nitrogen atmosphere for 6 hours to obtain an inner core with the first coating layer and the second coating layer.

Hydroxyl-terminated polydimethylsiloxane was dissolved in xylene to form a coating solution, the inner core with the first coating layer and the second coating layer was then added thereto and uniformly stirred to form a mixed slurry, and the mixed slurry was then placed in a wet coating machine, and dried in a nitrogen atmosphere at 120° C. for 4 hours to obtain a positive electrode active material. The hydroxyl-terminated polydimethylsiloxane has a mass percentage content of polar functional groups (i.e., —OH) of 3.4%, a number-average molecular weight of 1,000, and a coating amount of 1 wt %, based on the weight of the inner core with the first coating layer and the second coating layer.

Preparation of Positive Electrode Plate

The prepared lithium manganese phosphate positive electrode active material coated with the three layers, a conductive agent of acetylene black, and a binder of polyvinylidene fluoride (PVDF) at a weight ratio of 92:2.5:5.5 were added to N-methylpyrrolidone (NMP), and fully stirred and mixed to obtain a positive electrode slurry. The positive electrode slurry was then uniformly applied to an aluminum foil at 0.280 g/1540.25 $mm^2$, and after drying, cold-pressing, and slitting, the positive electrode plate was obtained.

Preparation of Negative Electrode Plate

The negative electrode active material artificial graphite, hard carbon, the conductive agent acetylene black, the binder styrene butadiene rubber (SBR), and the thickening agent sodium carboxymethyl cellulose (CMC) were dissolved in the solvent deionized water at a weight ratio of 90:5:2:2:1 and stirred and uniformly mixed to prepare a negative electrode slurry. The negative electrode slurry was uniformly applied to a negative electrode current collector copper foil at 0.117 g/1540.25 $mm_2$, and after drying, cold-pressing, and slitting, the negative electrode plate was obtained.

Preparation of Electrolyte Solution

In an argon atmosphere glove box ($H_2O<0.1$ ppm and $O_2<0.1$ ppm), the organic solvents ethylene carbonate (EC) and ethyl methyl carbonate (EMC) were uniformly mixed at a volume ratio of 3/7, and 12.5 wt % (based on the weight of the organic solvents) of $LiPF_6$ was dissolved in the above organic solvents and uniformly stirred to obtain the electrolyte solution.

Separator

A commercially available PP-PE copolymer microporous thin film having a thickness of 20 μm and an average pore size of 80 nm (Model 20, from Zhuogao Electronic Technology Co. Ltd.) was used.

Preparation of Full Battery

The above obtained positive electrode plate, separator, and negative electrode plate were stacked in sequence, such that the separator was located between the positive electrode and the negative electrode and played a role of isolation, and the stack was wound to obtain an electrode assembly. The electrode assembly was placed in an outer package, the above electrolyte solution was injected, and the electrode assembly was packaged to obtain a full battery (hereinafter also referred to as "quandian" in Chinese).

Preparation of Button-Type Battery

The prepared lithium manganese phosphate positive electrode active material coated with the three layers, PVDF, and acetylene black were added to NMP at a weight ratio of 90:5:5, and stirred in a drying room to prepare a slurry. An aluminum foil was coated with the slurry, after drying and cold-pressing, a positive electrode plate was obtained. The coating amount was 0.2 $g/cm^2$, and the compacted density was 2.0 $g/cm^3$.

A lithium plate, which was used as a negative electrode, and a solution of 1 mol/L of $LiPF_6$ in ethylene carbonate (EC)+diethyl carbonate (DEC)+dimethyl carbonate (DMC) at a volume ratio of 1:1:1 was used as an electrolyte solution were assembled, together with the prepared positive electrode plate, into a button-type battery in a button battery box (hereinafter also referred to as "button battery").

Examples 1-2 to 1-6

During the preparation of the co-doped lithium manganese phosphate inner core, the preparation conditions for the lithium manganese phosphate inner cores in Examples 1-2 to 1-6 were the same as those in Example 1-1, except that vanadium dichloride and cobalt sulfate were not used, and 463.4 g of ferrous carbonate, 1.6 g of 60% dilute sulfuric acid, 1148.9 g of ammonium dihydrogen phosphate, and 369.0 g of lithium carbonate were used.

In addition, during the preparation of lithium iron pyrophosphate and lithium iron phosphate and during the process of coating with the first coating layer, the second coating layer, and the third coating layer, except that the raw materials used were adjusted correspondingly according to the ratio of the coating amount shown in Table 1 to the coating amount corresponding to Example 1-1, such that the amounts of $Li_2FeP_2O_7/LiFePO_4$ in Examples 1-2 to 1-6 were 12.6 g/37.7 g, 15.7 g/47.1 g, 18.8 g/56.5 g, 22.0 g/66.0 g, and 25.1 g/75.4 g, respectively, the amount of sucrose in Examples 1-2 to 1-6 was 37.3 g, and the amount of the hydroxyl-terminated polydimethylsiloxane used in the coating process of Examples 1-2 to 1-6 was adjusted to 1 wt % of the inner core with the first coating layer and the second coating layer, the other conditions were the same as those in Example 1-1.

Examples 1-7 to 1-10

The conditions of Examples 1-7 to 1-10 were the same as those in Examples 1-3, except that the amounts of sucrose were 74.6 g, 149.1 g, 186.4 g, and 223.7 g, respectively, such that the corresponding coating amounts of the carbon layers as the second coating layers were 31.4 g, 62.9 g, 78.6 g, and 94.3 g, respectively, and the amount of the hydroxyl-terminated polydimethylsiloxane used in the coating process was adjusted to 1 wt % of the inner core with the first coating layer and the second coating layer.

Examples 1-11 to 1-14

The conditions of Examples 1-11 to 1-14 were the same as those in Example 1-7, except that during the preparation of lithium iron pyrophosphate and lithium iron phosphate, the amounts of various raw materials were adjusted correspondingly according to the coating amounts shown in Table 1, such that the amounts of $Li_2FeP_2O_7/LiFePO_4$ were 23.6 g/39.3 g, 31.4 g/31.4 g, 39.3 g/23.6 g, and 47.2 g/15.7 g, respectively, and the amount of the hydroxyl-terminated polydimethylsiloxane used in the coating process was adjusted to 1 wt % of the inner core with the first coating layer and the second coating layer.

Example 1-15

The conditions of Example 1-15 were the same as those in Example 1-14, except that during the preparation of the co-doped lithium manganese phosphate inner core, 492.80 g of zinc carbonate was used to replace ferrous carbonate, and the amount of the hydroxyl-terminated polydimethylsiloxane used in the coating process was adjusted to 1 wt % of the inner core with the first coating layer and the second coating layer.

Examples 1-16 to 1-18

The conditions of Examples 1-16 to 1-18 were the same as those in Example 1-7, except that in Example 1-16, during the preparation of the co-doped lithium manganese phosphate inner core, and 466.4 g of nickel carbonate, 5.0 g of zinc carbonate, and 7.2 g of titanium sulfate instead of ferrous carbonate were used; in Example 1-17, during the preparation of the co-doped lithium manganese phosphate inner core, 455.2 g of ferrous carbonate and 8.5 g of vanadium dichloride were used; in Example 1-18, during the preparation of the co-doped lithium manganese phosphate inner core, 455.2 g of ferrous carbonate, 4.9 g of vanadium dichloride, and 2.5 g of magnesium carbonate were used; and in Examples 1-16 to 1-18, the amount of the hydroxyl-terminated polydimethylsiloxane used in the coating process was adjusted to 1 wt % of the inner core with the first coating layer and the second coating layer.

Examples 1-19 to 1-20

The conditions of Examples 1-19 to 1-20 were the same as those in Example 1-18, except that in Example 1-19, during the preparation of the co-doped lithium manganese phosphate inner core, 369.4 g of lithium carbonate was used and 1.05 g of 60% of diluted nitric acid instead of dilute sulfuric acid was used; in Example 1-20, during the preparation of the co-doped lithium manganese phosphate inner core, 369.7 g of lithium carbonate and 0.78 g of metasilicic acid instead of dilute sulfuric acid were used; and in Examples 1-19 to 1-20, the amount of the hydroxyl-terminated polydimethylsiloxane used in the coating process was adjusted to 1 wt % of the inner core with the first coating layer and the second coating layer.

Examples 1-21 to 1-22

The conditions of Examples 1-21 to 1-22 were the same as those in Example 1-20, except that in Example 1-21, during the preparation of the co-doped lithium manganese phosphate inner core, 632.0 g of manganese carbonate, 463.30 g of ferrous carbonate, 30.5 g of vanadium dichloride, 21.0 g of magnesium carbonate, and 0.78 g of metasilicic acid were used; in Example 1-22, during the preparation of the co-doped lithium manganese phosphate inner core, 746.9 g of manganese carbonate, 289.6 g of ferrous carbonate, 60.9 g of vanadium dichloride, 42.1 g of magnesium carbonate, and 0.78 g of metasilicic acid were used; and in Examples 1-21 to 1-22, the amount of the hydroxyl-terminated polydimethylsiloxane used in the coating process was adjusted to 1 wt % of the inner core with the first coating layer and the second coating layer.

Examples 1-23 to 1-24

The conditions of Examples 1-23 to 1-24 were the same as those in Example 1-22, except that in Example 1-23, during the preparation of the co-doped lithium manganese phosphate inner core, 804.6 g of manganese carbonate, 231.7 g of ferrous carbonate, 1156.2 g of ammonium dihydrogen phosphate, 1.2 g of boric acid (mass fraction 99.5%), and 370.8 g of lithium carbonate were used; in Example 1-24, during the preparation of the co-doped lithium manganese phosphate inner core, 862.1 g of manganese carbonate, 173.8 g of ferrous carbonate, 1155.1 g of ammonium dihydrogen phosphate, 1.86 g of boric acid (mass fraction 99.5%), and 371.6 g of lithium carbonate were used; and in Examples 1-23 to 1-24, the amount of the hydroxyl-terminated polydimethylsiloxane used in the coating process was adjusted to 1 wt % of the inner core with the first coating layer and the second coating layer.

Example 1-25

The conditions of Example 1-25 were the same as those in Example 1-20, except that in Example 1-25, during the preparation of the co-doped lithium manganese phosphate inner core, 370.1 g of lithium carbonate, 1.56 g of metasilicic acid, and 1147.7 g of ammonium dihydrogen phosphate were used, and the amount of the hydroxyl-terminated polydimethylsiloxane used in the coating process was adjusted to 1 wt % of the inner core with the first coating layer and the second coating layer.

Example 1-26

The conditions of Example 1-26 were the same as those in Example 1-20, except that in Example 1-26, during the preparation of the co-doped lithium manganese phosphate inner core, 368.3 g of lithium carbonate, 4.9 g of dilute sulfuric acid with a mass fraction of 60%, 919.6 g of manganese carbonate, 224.8 g of ferrous carbonate, 3.7 g of vanadium dichloride, 2.5 g of magnesium carbonate, and 1146.8 g of ammonium dihydrogen phosphate were used, and the amount of the hydroxyl-terminated polydimethylsiloxane used in the coating process was adjusted to 1 wt % of the inner core with the first coating layer and the second coating layer.

Example 1-27

The conditions of Example 1-27 were the same as those in Example 1-20, except that in Example 1-27, during the preparation of the co-doped lithium manganese phosphate inner core, 367.9 g of lithium carbonate, 6.5 g of 60% dilute sulfuric acid, and 1145.4 g of ammonium dihydrogen phosphate were used, and the amount of the hydroxyl-terminated polydimethylsiloxane used in the coating process was adjusted to 1 wt % of the inner core with the first coating layer and the second coating layer.

Examples 1-28 to 1-33

The conditions of Examples 1-28 to 1-33 were the same as those in Example 1-20, except that in Examples of 1-28 to 1-33, during the preparation of the co-doped lithium manganese phosphate inner core, 1034.5 g of manganese carbonate, 108.9 g of ferrous carbonate, 3.7 g of vanadium dichloride, and 2.5 g of magnesium carbonate were used, the amounts of lithium carbonate were respectively 367.6 g, 367.2 g, 366.8 g, 366.4 g, 366.0 g, and 332.4 g, the amounts of ammonium dihydrogen phosphate were respectively 1144.5 g, 1143.4 g, 1142.2 g, 1141.1 g, 1139.9 g, and 1138.8 g, and the amounts of 60% dilute sulfuric acid were respectively 8.2 g, 9.8 g, 11.4 g, 13.1 g, 14.7 g, and 16.3 g, and the amount of the hydroxyl-terminated polydimethylsiloxane used in the coating process was adjusted to 1 wt % of the inner core with the first coating layer and the second coating layer.

Example 2-1

Except that during the preparation of lithium iron pyrophosphate ($Li_2FeP_2O_7$), in the powder sintering step, the sintering was performed at a temperature of 550° C. for a time of 1 hour so as to control the crystallinity of the $Li_2FeP_2O_7$ to be 30%, and during the preparation of lithium iron phosphate ($LiFePO_4$), in the coating sintering step, the sintering was performed at a temperature of 650° C. for a time of 2 hours so as to control the crystallinity of the $LiFePO_4$ to be 30%, the other conditions were the same as those in Example 1-1.

Example 2-2

Except that during the preparation of lithium iron pyrophosphate ($Li_2FeP_2O_7$), in the powder sintering step, the sintering was performed at a temperature of 550° C. for a time of 2 hours so as to control the crystallinity of the $Li_2FeP_2O_7$ to be 50%, and during the preparation of lithium iron phosphate ($LiFePO_4$), in the coating sintering step, the sintering was performed at a temperature of 650° C. for a time of 3 hours so as to control the crystallinity of the $LiFePO_4$ to be 50%, the other conditions were the same as those in Example 1-1.

Example 2-3

Except that during the preparation of lithium iron pyrophosphate ($Li_2FeP_2O_7$), in the powder sintering step, the sintering was performed at a temperature of 600° C. for a time of 3 hours so as to control the crystallinity of the $Li_2FeP_2O_7$ to be 70%, and during the preparation of lithium iron phosphate ($LiFePO_4$), in the coating sintering step, the sintering was performed at a temperature of 650° C. for a time of 4 hours so as to control the crystallinity of the $LiFePO_4$ to be 70%, the other conditions were the same as those in Example 1-1.

Examples 3-1 to 3-11

The other conditions were the same as those in Example 1-1, except that in the coating process, the hydroxyl-terminated polydimethylsiloxane was respectively replaced with thiopropyl polysiloxane (the polar functional group was —$CH_2SH$, the mass percentage content was 15%, and the number-average molecular weight was 2,000), aminoethyl-aminopropylpolydimethylsiloxane (the polar functional groups were —$CH_2NH_2$ and —$CH_2NH$—, the mass percentage content was 12%, and the number-average molecular weight was 3,700), side-chain-polyether-grafted polydimethylsiloxane (the polar functional group was a polyether chain segment, the mass percentage content was 7.1%, and the number-average molecular weight was 15,412), side-chain-phosphate-grafted polydimethylsiloxane (the polar functional group was a phosphate group, the mass percentage content was 1.42%, and the number-average molecular weight was 15,600), polydimethylsiloxane (the mass percentage content of the polar functional group was about 0% and the number-average molecular weight was 1,200), polymethylchloropropyl siloxane (the polar functional group was —$CH_2Cl$ the mass percentage content was 30.2%, and the number-average molecular weight was 2,500), epoxy-terminated polysiloxane (the polar functional group was an ethylene oxide group, the mass percentage content was 0.42%, and the number-average molecular weight was 10,000), polyether-terminated polydimethylsiloxane (the polar functional group was a polyether chain segment, the mass percentage content was 10%, and the number-average molecular weight was 2,000), 1,3,5,7-octamethylcyclotetrasiloxane (the mass percentage content of the polar functional group was about 0% and the molecular weight was 280), cyclopentadimethylsiloxane (the mass percentage content of the polar functional group was about 0% and the molecular weight was 370), and polyether-terminated polydimethylsiloxane (the polar functional group was a polyether chain segment, the mass percentage content was 55%, and the number-average molecular weight was 25,000).

Examples 3-12 to 3-17

Except that in the coating process, the coating amount of the hydroxyl-terminated polydimethylsiloxane was replaced with 0.01 wt %, 0.1 wt %, 2 wt %, 5 wt %, 10 wt %, and 12 wt %, respectively (based on the weight of the inner core with the first coating layer and the second coating layer), the other conditions were the same as those in Example 1-1.

Examples 3-18 to 3-25

Except that in the coating process, the hydroxyl-terminated polydimethylsiloxane was replaced with polydimethylsiloxanes having number-average molecular weights of 400, 10,000, 50,000, 80,000, 100,000, 300,000, and 400,000, respectively, the other conditions were the same as those in Example 1-1.

Comparative Example 1

Preparation of manganese oxalate: 1149.3 g of manganese carbonate was added to a reaction kettle, and 5 L of deionized water and 1260.6 g of oxalic acid dihydrate (as $C_2H_2O_4 \cdot 2H_2O$, the same below) were added. The reaction kettle was heated to 80° C., stirring was performed at a rotation speed of 600 rpm for 6 hours until the reaction was completed (no bubbles were generated) to obtain a manganese oxalate suspension. Then, the suspension was filtered, and the filter cake was dried at 120° C. and then ground to obtain manganese oxalate dihydrate particles with a median particle size Dv50 of 100 nm.

Preparation of carbon-coated lithium manganese phosphate: 1789.6 g of the above obtained manganese oxalate dihydrate particles, 369.4 g of lithium carbonate (as $Li_2CO_3$, the same below), 1150.1 g of ammonium dihydrogen phosphate (as $NH_4H_2PO_4$, the same below), and 31 g of sucrose (as $C_{12}H_{22}O_{11}$, the same below) were added to 20 L of deionized water, and the mixture was stirred for 10 hours until uniformly mixed, so as to obtain a slurry. The slurry was transferred to a spray drying device for spray-drying granulation at a set drying temperature of 250° C. for 4 hours to obtain a powder. The above powder was sintered at 700° C. for 4 hours in a protective atmosphere of nitrogen (90 vol %+hydrogen (10 vol %) to obtain carbon-coated lithium manganese phosphate.

Comparative Example 2

Except that 689.5 g of manganese carbonate was used and 463.3 g of ferrous carbonate was additionally added, the other conditions of Comparative Example 2 were the same as those in Comparative Example 1.

Comparative Example 3

Except that 1148.9 g of ammonium dihydrogen phosphate and 369.0 g of lithium carbonate were used and 1.6 g of 60% dilute sulfuric acid was additionally added, the other conditions of Comparative Example 3 were the same as those of Comparative Example 1.

Comparative Example 4

Except that 689.5 g of manganese carbonate, 1148.9 g of ammonium dihydrogen phosphate, and 369.0 g of lithium carbonate were used and 463.3 g of ferrous carbonate and 1.6 g of 60% dilute sulfuric acid were additionally added, the other conditions of Comparative Example 4 were the same as those of Comparative Example 1.

Comparative Example 5

Except for the following additional steps: Preparation of lithium iron pyrophosphate powder: 9.52 g of lithium carbonate, 29.9 g of ferrous carbonate, 29.6 g of ammonium dihydrogen phosphate, and 32.5 g of oxalic acid dihydrate were dissolved in 50 mL of deionized water. The pH of the mixture was 5, and stirring was performed for 2 hours such that the reaction mixture was fully reacted. Then, the reacted solution was heated to 80° C. and maintained at this temperature for 4 hours to obtain a suspension of $Li_2FeP_2O_7$, and the suspension was filtered, washed with deionized water, and dried at 120° C. for 4 hours to obtain a powder. The powder was sintered at 500° C. in a nitrogen atmosphere for 4 hours, naturally cooled to room temperature and then ground to control the crystallinity of $Li_2FeP_2O_7$ to be 5%, and except that during the preparation of the carbon-coated material, the amount of $Li_2FeP_2O_7$ was 62.8 g, the other conditions of Comparative Example 5 were the same as those in Comparative Example 4.

Comparative Example 6

Except for the following additional steps: Preparation of lithium iron phosphate suspension: 14.7 g of lithium carbonate, 46.1 g of ferrous carbonate, 45.8 g of ammonium dihydrogen phosphate, and 50.2 g of oxalic acid dihydrate were dissolved in 500 mL of deionized water, and then stirred for 6 hours such that the mixture was fully reacted. Then, the reaction solution was heated to 120° C. and maintained at this temperature for 6 hours to obtain a suspension of $LiFePO_4$, except that during the preparation of lithium iron phosphate ($LiFePO_4$), in the coating sintering step, the sintering was performed at 600° C. for a time of 4 hours to control the crystallinity of $LiFePO_4$ to be 8%, and during the preparation of the carbon-coated material, the amount of $LiFePO_4$ was 62.8 g, the other conditions of Comparative Example 6 were the same as those in Comparative Example 4.

Comparative Example 7

Preparation of lithium iron pyrophosphate powder: 2.38 g of lithium carbonate, 7.5 g of ferrous carbonate, 7.4 g of ammonium dihydrogen phosphate, and 8.1 g of oxalic acid dihydrate were dissolved in 50 mL of deionized water. The pH of the mixture was 5, and stirring was performed for 2 hours such that the reaction mixture was fully reacted. Then, the reacted solution was heated to 80° C. and maintained at this temperature for 4 hours to obtain a suspension of $Li_2FeP_2O_7$, and the suspension was filtered, washed with deionized water, and dried at 120° C. for 4 hours to obtain a powder. The powder was sintered at 500° C. in a nitrogen atmosphere for 4 hours, naturally cooled to room temperature, and then ground to control the crystallinity of $Li_2FeP_2O_7$ to be 5%.

Preparation of lithium iron phosphate suspension: 11.1 g of lithium carbonate, 34.7 g of ferrous carbonate, 34.4 g of ammonium dihydrogen phosphate, 37.7 g of oxalic acid dihydrate, and 37.3 g of sucrose (as $C_{12}H_{22}O_{11}$, the same below) were dissolved in 1,500 mL of deionized water and then stirred for 6 hours such that the mixture was fully reacted. Then, the reacted solution was heated to 120° C. and maintained at this temperature for 6 hours to obtain a suspension of $LiFePO_4$.

15.7 g of the obtained lithium iron pyrophosphate powder was added to the above lithium iron phosphate ($LiFePO_4$) and sucrose suspension, and except that in the preparation process, in the coating sintering step, the sintering was performed at 600° C. for a time of 4 hours to control the crystallinity of $LiFePO_4$ to be 8%. The other conditions of Comparative Example 7 were the same as those in Comparative Example 4, so as to obtain a positive electrode active material coated with amorphous lithium iron pyrophosphate, amorphous lithium iron phosphate, and carbon.

Comparative Example 8

Except that during the preparation of the positive electrode active material, no third coating layer was coated, the other conditions were the same as those in Example 1-1.

The preparation of the positive electrode plate, the preparation of the negative electrode plate, the preparation of the electrolyte solution, and the preparation of the separator and the battery in the above examples and comparative examples were all the same as the processes in Example 1-1.

Test for Relevant Parameters

1. Determination of the Chemical Formula of Inner Core and the Composition of Different coating layers:

High spatial resolution characterization was performed on the internal microstructure and surface structure of the positive electrode active material by using a spherical aberration-corrected scanning transmission electron microscope (ACSTEM), and a three-dimensional reconstruction technology was combined to obtain the chemical formula of the inner core and the composition of the first, second, and third coating layers of the positive electrode active material.

2. Test of Initial Gram Capacity of Button-Type Battery:

The above prepared button-type battery was charged to 4.3 V at 0.1 C, then charged at a constant voltage of 4.3 V until the current was less than or equal to 0.05 mA, left to stand for 5 minutes, and then discharged to 2.0 V at 0.1 C, when the discharge capacity was the initial gram capacity and denoted as D0.

3. Test of Average Discharge Voltage (V) of Button Battery:

The above prepared button-type battery was left to stand for 5 minutes at a constant temperature of 25° C., discharged to 2.5 V at 0.1 C, left to stand for 5 minutes, charged to 4.3 V at 0.1 C, then charged at a constant voltage of 4.3 V until the current was less than or equal to 0.05 mA, and left to stand for 5 minutes, and the battery was then discharged to 2.5 V at 0.1 C, when the discharge capacity was the initial gram capacity and denoted as D0. The discharge energy was the initial energy and denoted as E0, and the average discharge voltage (V) of the button battery was E0/D0.

4. Test of Expansion of Full Battery at 60° C.:

At 60° C., the above prepared full battery with 100% state of charge (SOC) was stored. Before, after, and during storage, the open-circuit voltage (OCV) and alternating current internal impedance (IMP) of the battery were measured to monitor the SOC, and the volume of the battery was measured. Herein, the full battery was taken out after every 48 hours of storage, left to stand for 1 hour, and then tested for the open-circuit voltage (OCV) and internal impedance (IMP), and after the full battery was cooled to room temperature, the volume of the battery was measured with a water displacement method. The water displacement method means that the gravity $F_1$ of the battery was measured separately using a balance with automatic unit conversion of on-board data, the battery was then completely placed in deionized water (with a density known to be 1 $g/cm^3$), the gravity $F_2$ of the battery at this time was measured, the buoyancy $F_{buoyancy}$ on the battery was $F_1-F_2$, and the volume V of the battery=$(F_1-F_2)/(\rho \times g)$ was then calculated according to the Archimedes' principle $F_{buoyancy}=\rho \times g \times V_{displaced}$.

From the test results of OCV and IMP, the batteries of all the examples always maintained an SOC of 99% or more during the test process untill the end of the storage.

After 30 days of storage, the volume of the battery was measured, and the percentage increase of the volume of the battery after storage relative to the volume of the battery before storage was calculated.

5. Test of Cycling Performance of Full Battery at 45° C.:

In a constant-temperature environment at 45° C., the above prepared full battery was charged to 4.3 V at 1 C and then charged at a constant voltage of 4.3 V until the current was less than or equal to 0.05 mA. The full battery was left to stand for 5 minutes and then discharged to 2.5 V at 1 C. The discharge capacity at this time was denoted as D0. The charge/discharge cycle was repeated until the discharge capacity was reduced to 80% of D0. The number of cycles experienced by the battery at this time was recorded.

6. Method for Measuring Lattice Change Rate:

In a constant-temperature environment at 25° C., the above prepared positive electrode active material sample was placed in XRD (model: Bruker D8 Discover) and tested at 1°/min, and the test data was sorted and analyzed; and with reference to a standard PDF card, the lattice constants a0, b0, c0, and v0 at this time were calculated (a0, b0, and c0 represented the lengths of a unit cell on all sides, and v0 represented the volume of the unit cell, which could be obtained directly from the XRD refinement results).

By using the above method for preparing a button battery, the positive electrode active material sample was manufactured into a button battery, and the above button battery was charged at a small rate of 0.05 C until the current was reduced to 0.01 C. Then, a positive electrode plate in the button battery was taken out and soaked in dimethyl carbonate (DMC) for 8 hours. Then, the positive electrode plate was dried and subjected to powder scraping, and particles with a particle size of less than 500 nm were screened out. Sampling was performed, and the volume v1 of a unit cell was calculated in the same way as that for testing the fresh sample as described above. (v0−v1)/v0×100% was shown in a table as the lattice change rate (the change rate of the volume of the unit cell) of the sample before and after complete lithium de-intercalation.

7. Test of Li/Mn Antisite Defect Concentration:

The XRD test results in the "Method for measuring lattice change rate" were compared with the PDF (Powder Diffraction File) card of a standard crystal, so as to obtain the Li/Mn antisite defect concentration. Specifically, the XRD test results in the "Method for measuring lattice change rate" were imported into a general structure analysis system (GSAS) software, refinement results were obtained automatically, including the occupancies of different atoms, and the Li/Mn antisite defect concentration was obtained by reading the refinement results.

8. Test of Dissolution of Transition Metal:

After cycling at 45° C. until the capacity was attenuated to 80%, the full battery was discharged to a cut-off voltage of 2.0 V at a rate of 0.1 C. Then, the battery was disassembled, a negative electrode plate was taken out, a round piece of 30 unit areas (1540.25 mm$^2$) was randomly taken from the negative electrode plate, and inductively coupled plasma (ICP) emission spectroscopy was performed with Agilent ICP-OES730. The amounts of Fe (if the positive electrode active material was doped with Fe at the Mn site) and Mn therein were calculated according to the ICP results, and thus, the dissolution amount of Mn (and Fe doping at the Mn site) after cycling was calculated. The testing standard was in accordance with EPA-6010D-2014.

9. Test of Surface Oxygen Valence State:

5 g of the above prepared positive electrode active material sample was manufactured into a button battery according to the above method for preparing a button battery. The button battery was charged at a small rate of 0.05 C until the current was reduced to 0.01 C. Then, a positive electrode plate in the button battery was taken out and soaked in dimethyl carbonate (DMC) for 8 hours. Then, the positive electrode plate was dried and subjected to powder scraping, and particles with a particle size of less than 500 nm were screened out. The obtained particles were measured with an electron energy loss spectroscopy (EELS, instrument model: Talos F200S) to obtain an energy loss near-edge structure (ELNES) which reflected the state density and the energy level distribution of an element. According to the state density and the energy level distribution, the number of occupied electrons was calculated by integrating the data of valence-band state density, and then, the surface oxygen valence state after charging was extrapolated.

10. Measurement of Compacted Density:

5 g of the above prepared positive electrode active material powder was put into a compaction dedicated mold (U.S. CARVER mold, model: 13 mm), and then, the mold was placed on a compacted density instrument. A pressure of 3 T (tons) was applied, the thickness (the thickness after pressure relief and the area of a container for testing was 1540.25 mm$^2$) of the powder under the pressure was read on the instrument, and the compacted density was calculated through ρ=m/v.

11. Test of Crystallinity of Pyrophosphate and Phosphate by X-Ray Diffraction:

5 g of the above prepared positive electrode active material powder was taken, and the total scattering intensity was measured by X rays, i.e., the sum scattering intensity of the substance in the whole space, which was only related to the intensity of primary rays, the chemical structure, and the total number of electrons participating in diffraction, i.e., the magnitude of the mass, and was independent of the order of the sample; and then, the crystalline scattering and non-crystalline scattering were separated from a diffraction pattern, and the crystallinity was the ratio of the scattering intensity of the crystalline part to the total scattering intensity.

12. Interplanar Spacing and Included Angle:

1 g of the above prepared each positive electrode active material powder was placed in a 50 mL test tube, 10 mL of alcohol with a mass fraction of 75% was injected into the test tube, the mixture was then fully stirred and dispersed for 30 minutes, and then, a clean disposable plastic straw was used to take an appropriate amount of the above solution and dripped onto a 300-mesh copper mesh. At this time, part of the powder would remain on the copper mesh. The copper mesh, along with the sample, was transferred to a TEM (Tabs F200s G2) sample chamber for testing, and an original picture of a TEM test was obtained.

The original picture obtained from the above TEM test was opened in DigitalMicrograph software and subjected to Fourier transform (automatically completed by the software after a clicking operation) to obtain a diffraction pattern, and the distance from a diffraction spot to the center position in the diffraction pattern was measured to obtain the interplanar spacing, and the angle was calculated according to Bragg's equation.

13. Test of Contact Angle:

At room temperature, ethylene carbonate (EC) was dripped onto the surface of a positive electrode film layer. The solid-liquid contact angle was tested within 60 seconds by using Model LSA 200 optical contact angle measuring instrument from LAUDA Scientific, Germany.

14. Test of Porosity:

A positive electrode film layer was stripped off by means of an adhesive tape and the porosity of the positive electrode film layer was tested by referring to GB/T 24586-2009. Porosity P=[(V2−V1)/V2]×100%.

V1 (cm$^3$) represented the true volume and could be measured by a displacement method using an inert gas with a small molecular diameter (e.g., helium) in combination with Archimedes' principle and Bohr's law.

V2 (cm$^3$) represented the apparent volume, V2=S×H×A, S (cm$^2$) represented the area, H (cm) represented the thickness, and A represented the number of samples.

Table 1 showed the compositions of the positive electrode active materials of Examples 1-1 to 1-33 and Comparative Examples 1-8.

Table 2 showed the performance data of the positive electrode active materials, the positive electrode plates, the button batteries or the full batteries of Examples 1-1 to 1-33 and Comparative Examples 1-8 tested by the above performance testing methods.

Table 3 showed the performance data of the positive electrode active materials, the positive electrode plates, the button batteries or the full batteries of Examples 2-1 to 2-3 tested by the above performance testing methods.

TABLE 1

| No. | Inner core | First coating layer | Second coating layer | Third coating layer |
|---|---|---|---|---|
| Example 1-1 | $Li_{0.999}Mn_{0.60}Fe_{0.393}V_{0.004}Co_{0.003}P_{0.999}S_{0.001}O_4$ | 1% $Li_2FeP_2O_7$/3% $LiFePO_4$ | 2% of carbon | 1% |
| Example 1-2 | $Li_{0.999}Mn_{0.60}FC_{0.40}P_{0.999}S_{0.001}O_4$ | 0.8% $Li_2FeP_2O_7$/2.4% $LiFePO_4$ | 1% of carbon | 1% |
| Example 1-3 | $Li_{0.999}Mn_{0.60}Fe_{0.40}P_{0.999}S_{0.001}O_4$ | 1% $Li_2FeP_2O_7$/3% $LiFePO_4$ | 1% of carbon | 1% |

TABLE 1-continued

| No. | Inner core | First coating layer | Second coating layer | Third coating layer |
|---|---|---|---|---|
| Example 1-4 | $Li_{0.999}Mn_{0.60}Fe_{0.40}P_{0.999}S_{0.001}O_4$ | 1.2% $Li_2FeP_2O_7$/3.6% $LiFePO_4$ | 1% of carbon | 1% |
| Example 1-5 | $Li_{0.999}Mn_{0.60}Fe_{0.40}P_{0.999}S_{0.001}O_4$ | 1.4% $Li_2FeP_2O_7$/4.2% $LiFePO_4$ | 1% of carbon | 1% |
| Example 1-6 | $Li_{0.999}Mn_{0.60}Fe_{0.40}P_{0.999}S_{0.001}O_4$ | 1.6% $Li_2FeP_2O_7$/4.8% $LiFePO_4$ | 1% of carbon | 1% |
| Example 1-7 | $Li_{0.999}Mn_{0.60}Fe_{0.40}P_{0.999}S_{0.001}O_4$ | 1% $Li_2FeP_2O_7$/3% $LiFePO_4$ | 2% of carbon | 1% |
| Example 1-8 | $Li_{0.999}Mn_{0.60}Fe_{0.40}P_{0.999}S_{0.001}O_4$ | 1% $Li_2FeP_2O_7$/3% $LiFePO_4$ | 4% of carbon | 1% |
| Example 1-9 | $Li_{0.999}Mn_{0.60}Fe_{0.40}P_{0.999}S_{0.001}O_4$ | 1% $Li_2FeP_2O_7$/3% $LiFePO_4$ | 5% of carbon | 1% |
| Example 1-10 | $Li_{0.999}Mn_{0.60}Fe_{0.40}P_{0.999}S_{0.001}O_4$ | 1% $Li_2FeP_2O_7$/3% $LiFePO_4$ | 6% of carbon | 1% |
| Example 1-11 | $Li_{0.999}Mn_{0.60}Fe_{0.40}P_{0.999}S_{0.001}O_4$ | 1.5% $Li_2FeP_2O_7$/2.5% $LiFePO_4$ | 2% of carbon | 1% |
| Example 1-12 | $Li_{0.999}Mn_{0.60}Fe_{0.40}P_{0.999}S_{0.001}O_4$ | 2% $Li_2FeP_2O_7$/2% $LiFePO_4$ | 2% of carbon | 1% |
| Example 1-13 | $Li_{0.999}Mn_{0.60}Fe_{0.40}P_{0.999}S_{0.001}O_4$ | 2.5% $Li_2FeP_2O_7$/1.5% $LiFePO_4$ | 2% of carbon | 1% |
| Example 1-14 | $Li_{0.999}Mn_{0.60}Fe_{0.40}P_{0.999}S_{0.001}O_4$ | 3% $Li_2FeP_2O_7$/1% $LiFePO_4$ | 2% of carbon | 1% |
| Example 1-15 | $Li_{0.999}Mn_{0.60}Zn_{0.40}P_{0.999}S_{0.001}O_4$ | 3% $Li_2FeP_2O_7$/1% $LiFePO_4$ | 2% of carbon | 1% |
| Example 1-16 | $Li_{0.993}Mn_{0.6}Ni_{0.393}Zn_{0.004}Ti_{0.003}P_{0.999}S_{0.001}O_4$ | 1% $Li_2FeP_2O_7$/3% $LiFePO_4$ | 2% of carbon | 1% |
| Example 1-17 | $Li_{0.999}Mn_{0.60}Fe_{0.393}V_{0.007}P_{0.999}S_{0.001}O_4$ | 1% $Li_2FeP_2O_7$/3% $LiFePO_4$ | 2% of carbon | 1% |
| Example 1-18 | $Li_{0.999}Mn_{0.60}Fe_{0.393}V_{0.004}Mg_{0.003}P_{0.999}S_{0.001}O_4$ | 1% $Li_2FeP_2O_7$/3% $LiFePO_4$ | 2% of carbon | 1% |
| Example 1-19 | $LiMn_{0.60}Fe_{0.393}V_{0.004}Mg_{0.003}P_{0.999}N_{0.001}O_4$ | 1% $Li_2FeP_2O_7$/3% $LiFePO_4$ | 2% of carbon | 1% |
| Example 1-20 | $Li_{1.001}Mn_{0.60}Fe_{0.393}V_{0.004}Mg_{0.003}P_{0.999}Si_{0.001}O_4$ | 1% $Li_2FeP_2O_7$/3% $LiFePO_4$ | 2% of carbon | 1% |
| Example 1-21 | $Li_{1.001}Mn_{0.55}Fe_{0.40}V_{0.025}Mg_{0.025}P_{0.999}Si_{0.001}O_4$ | 1% $Li_2FeP_2O_7$/3% $LiFePO_4$ | 2% of carbon | 1% |
| Example 1-22 | $Li_{1.001}Mn_{0.65}Fe_{0.25}V_{0.05}Mg_{0.05}P_{0.999}Si_{0.001}O_4$ | 1% $Li_2FeP_2O_7$/3% $LiFePO_4$ | 2% of carbon | 1% |
| Example 1-23 | $Li_{1.004}Mn_{0.7}Fe_{0.2}V_{0.05}Mg_{0.05}P_{0.998}B_{0.002}O_4$ | 1% $Li_2FeP_2O_7$/3% $LiFePO_4$ | 2% of carbon | 1% |
| Example 1-24 | $Li_{1.006}Mn_{0.75}Fe_{0.15}V_{0.05}Mg_{0.05}P_{0.997}B_{0.003}O_4$ | 1% $Li_2FeP_2O_7$/3% $LiFePO_4$ | 2% of carbon | 1% |
| Example 1-25 | $Li_{1.002}Mn_{0.60}Fe_{0.393}V_{0.004}Mg_{0.003}P_{0.998}Si_{0.002}O_4$ | 1% $Li_2FeP_2O_7$/3% $LiFePO_4$ | 2% of carbon | 1% |
| Example 1-26 | $Li_{0.997}Mn_{0.80}Fe_{0.194}V_{0.003}Mg_{0.003}P_{0.997}S_{0.003}O_4$ | 1% $Li_2FeP_2O_7$/3% $LiFePO_4$ | 2% of carbon | 1% |
| Example 1-27 | $Li_{0.996}Mn_{0.60}Fe_{0.393}V_{0.004}Mg_{0.003}P_{0.996}S_{0.004}O_4$ | 1% $Li_2FeP_2O_7$/3% $LiFePO_4$ | 2% of carbon | 1% |
| Example 1-28 | $Li_{0.995}Mn_{0.9}Fe_{0.094}V_{0.003}Mg_{0.003}P_{0.995}S_{0.005}O_4$ | 1% $Li_2FeP_2O_7$/3% $LiFePO_4$ | 2% of carbon | 1% |
| Example 1-29 | $Li_{0.994}Mn_{0.90}Fe_{0.094}V_{0.003}Mg_{0.003}P_{0.994}S_{0.006}O_4$ | 1% $Li_2FeP_2O_7$/3% $LiFePO_4$ | 2% of carbon | 1% |
| Example 1-30 | $Li_{0.993}Mn_{0.90}Fe_{0.094}V_{0.003}Mg_{0.003}P_{0.993}S_{0.007}O_4$ | 1% $Li_2FeP_2O_7$/3% $LiFePO_4$ | 2% of carbon | 1% |
| Example 1-31 | $Li_{0.992}Mn_{0.90}Fe_{0.094}V_{0.003}Mg_{0.003}P_{0.992}S_{0.008}O_4$ | 1% $Li_2FeP_2O_7$/3% $LiFePO_4$ | 2% of carbon | 1% |
| Example 1-32 | $Li_{0.991}Mn_{0.90}Fe_{0.094}V_{0.003}Mg_{0.003}P_{0.991}S_{0.009}O_4$ | 1% $Li_2FeP_2O_7$/3% $LiFePO_4$ | 2% of carbon | 1% |
| Example 1-33 | $Li_{0.9}Mn_{0.90}Fe_{0.094}V_{0.003}Mg_{0.003}P_{0.9}S_{0.1}O_4$ | 1% $Li_2FeP_2O_7$/3% $LiFePO_4$ | 2% of carbon | 1% |
| Comparative Example 1 | $LiMnPO_4$ | — | 1% of carbon | / |
| Comparative Example 2 | $LiMn_{0.60}Fe_{0.40}PO_4$ | — | 1% of carbon | / |
| Comparative Example 3 | $Li_{0.999}MnP_{0.999}S_{0.001}O_4$ | — | 1% of carbon | / |
| Comparative Example 4 | $Li_{0.999}Mn_{0.60}Fe_{0.40}P_{0.999}S_{0.001}O_4$ | — | 1% of carbon | / |
| Comparative Example 5 | $Li_{0.999}Mn_{0.60}Fe_{0.40}P_{0.999}S_{0.001}O_4$ | 4% of amorphous $Li_2FeP_2O_7$ | 1% of carbon | / |
| Comparative Example 6 | $Li_{0.999}Mn_{0.60}Fe_{0.40}P_{0.999}S_{0.001}O_4$ | 4% of amorphous $LiFePO_4$ | 1% of carbon | / |
| Comparative Example 7 | $Li_{0.999}Mn_{0.60}Fe_{0.40}P_{0.999}S_{0.001}O_4$ | 1% of amorphous $Li_2FeP_2O_7$ + 3% of amorphous $LiFePO_4$ | 1% of carbon | / |

TABLE 1-continued

| No. | Inner core | First coating layer | Second coating layer | Third coating layer |
|---|---|---|---|---|
| Comparative Example 8 | $Li_{0.999}Mn_{0.60}Fe_{0.393}V_{0.004}Co_{0.003}P_{0.999}S_{0.001}O_4$ | 1% $Li_2FeP_2O_7$/3% $LiFePO_4$ | 2% of carbon | / |

Note:
1) the crystallinities of $Li_2FeP_2O_7$ and LiFePO4 in Examples 1-1 to 1-33 were both 100%; 2) in Comparative Examples 5-7, the crystallinity of amorphous $Li_2FeP_2O_7$ was 5%, and the crystallinity of amorphous $LiFePO_4$ was 8%; and 3) the substances of the third coating layer of Examples 1-1 to 1-33 were all hydroxyl-terminated polydimethylsiloxane.

TABLE 2

| No. | Lattice change rate (%) | Li/Mn antisite defect concentration (%) | Dissolution amount of Fe and Mn after cycling (ppm) | Surface oxygen valence state | Compacted density (g/cm³) | Contact angle (°) | Porosity (%) | Gram capacity of button battery at 0.1 C (mAh/g) | Average discharge voltage of button battery (V) | Expansion of battery upon 30 days of storage at 60° C. (%) | Number of cycles corresponding to 80% capacity retention rate at 45° C. |
|---|---|---|---|---|---|---|---|---|---|---|---|
| Example 1-1 | 2.30 | 0.40 | 3 | −1.98 | 2.42 | 16.6 | 25.2 | 158.30 | 3.78 | 1.80 | 1895 |
| Example 1-2 | 6.60 | 1.20 | 43 | −1.97 | 2.43 | 17.9 | 23.9 | 148.90 | 3.75 | 6.40 | 1365 |
| Example 1-3 | 6.50 | 1.10 | 21 | −1.97 | 2.45 | 17.8 | 23.6 | 148.50 | 3.74 | 5.30 | 1470 |
| Example 1-4 | 6.50 | 0.80 | 13 | −1.97 | 2.44 | 18.1 | 24.1 | 147.30 | 3.73 | 4.80 | 1530 |
| Example 1-5 | 6.50 | 0.70 | 9 | −1.98 | 2.45 | 17.8 | 23.8 | 146.80 | 3.73 | 3.60 | 1636 |
| Example 1-6 | 6.60 | 0.60 | 9 | −1.98 | 2.45 | 17.9 | 23.7 | 145.90 | 3.72 | 2.80 | 1745 |
| Example 1-7 | 6.50 | 1.00 | 23 | −1.97 | 2.46 | 16.3 | 25.4 | 147.50 | 3.73 | 4.80 | 1538 |
| Example 1-8 | 6.50 | 1.00 | 16 | −1.97 | 2.47 | 15.9 | 27.9 | 146.40 | 3.73 | 4.30 | 1573 |
| Example 1-9 | 6.40 | 1.10 | 10 | −1.98 | 2.44 | 15.2 | 29.1 | 144.30 | 3.73 | 3.70 | 1660 |
| Example 1-10 | 6.40 | 1.10 | 8 | −1.98 | 2.41 | 14.8 | 30.4 | 142.10 | 3.73 | 2.80 | 1779 |
| Example 1-11 | 6.50 | 1.10 | 15 | −1.97 | 2.44 | 16.5 | 25.2 | 147.80 | 3.74 | 5.20 | 1487 |
| Example 1-12 | 6.60 | 1.00 | 12 | −1.96 | 2.47 | 16.7 | 25.4 | 147.60 | 3.74 | 6.10 | 1454 |
| Example 1-13 | 6.70 | 1.20 | 10 | −1.96 | 2.46 | 16.3 | 25.3 | 147.20 | 3.74 | 6.90 | 1376 |
| Example 1-14 | 6.70 | 1.10 | 4 | −1.97 | 2.45 | 16.4 | 25.1 | 147.00 | 3.75 | 7.50 | 1324 |
| Example 1-15 | 7.50 | 2.50 | 9 | −1.97 | 2.45 | 16.8 | 25.3 | 138.70 | 3.86 | 8.40 | 1412 |
| Example 1-16 | 5.40 | 0.80 | 10 | −1.97 | 2.44 | 16.7 | 25.5 | 139.40 | 3.86 | 4.50 | 1534 |
| Example 1-17 | 4.20 | 0.60 | 9 | −1.97 | 2.45 | 16.6 | 25.3 | 153.20 | 3.78 | 3.20 | 1801 |
| Example 1-18 | 2.60 | 0.50 | 5 | −1.97 | 2.45 | 16.4 | 25.6 | 155.60 | 3.80 | 2.70 | 1805 |
| Example 1-19 | 2.30 | 0.50 | 3 | −1.98 | 2.45 | 16.9 | 25.2 | 157.60 | 3.80 | 2.10 | 1910 |
| Example 1-20 | 2.40 | 0.70 | 6 | −1.98 | 2.44 | 16.3 | 25.6 | 157.40 | 3.80 | 2.40 | 1928 |
| Example 1-21 | 2.20 | 0.50 | 2 | −1.98 | 2.43 | 17.1 | 25.3 | 158.40 | 3.72 | 2.00 | 2019 |
| Example 1-22 | 2.50 | 0.80 | 6 | −1.98 | 2.42 | 16.5 | 25.4 | 156.90 | 3.83 | 2.80 | 1850 |
| Example 1-23 | 2.60 | 0.80 | 5 | −1.98 | 2.43 | 16.7 | 25.1 | 157.10 | 3.83 | 2.50 | 1828 |
| Example 1-24 | 2.60 | 0.80 | 4 | −1.98 | 2.44 | 16.5 | 25.3 | 157.40 | 3.83 | 2.60 | 1887 |
| Example 1-25 | 2.30 | 0.70 | 6 | −1.98 | 2.45 | 16.8 | 25.5 | 157.30 | 3.78 | 2.40 | 1929 |
| Example 1-26 | 2.80 | 0.90 | 3 | −1.98 | 2.45 | 16.8 | 25.3 | 156.10 | 3.85 | 2.90 | 1688 |
| Example 1-27 | 2.20 | 0.60 | 6 | −1.98 | 2.46 | 16.6 | 25.4 | 157.50 | 3.78 | 2.40 | 1952 |
| Example 1-28 | 3.20 | 1.10 | 7 | −1.96 | 2.45 | 16.4 | 25.3 | 156.80 | 3.89 | 3.20 | 1649 |
| Example 1-29 | 3.00 | 1.20 | 8 | −1.95 | 2.44 | 16.6 | 25.1 | 156.10 | 3.89 | 3.20 | 1598 |
| Example 1-30 | 2.80 | 1.40 | 9 | −1.95 | 2.45 | 16.7 | 25.4 | 155.80 | 3.89 | 3.10 | 1510 |
| Example 1-31 | 2.60 | 1.40 | 10 | −1.94 | 2.44 | 16.4 | 25.1 | 155.40 | 3.89 | 3.00 | 1475 |
| Example 1-32 | 2.40 | 1.20 | 13 | −1.94 | 2.45 | 16.6 | 25.3 | 154.80 | 3.89 | 2.80 | 1457 |
| Example 1-33 | 2.10 | 0.90 | 9 | −1.94 | 2.44 | 16.8 | 25.2 | 154.50 | 3.89 | 2.70 | 1439 |
| Comparative Example 1 | 11.40 | 3.20 | 2060 | −1.55 | 1.81 | 1 | 30.1 | 125.60 | 4.02 | 48.60 | 185 |
| Comparative Example 2 | 8.70 | 2.80 | 1597 | −1.76 | 1.92 | 0 | 27.9 | 134.80 | 3.76 | 42.50 | 358 |
| Comparative Example 3 | 9.80 | 2.50 | 1895 | −1.66 | 1.88 | 2 | 28.8 | 128.60 | 4.05 | 45.50 | 267 |
| Comparative Example 4 | 6.70 | 1.80 | 1279 | −1.83 | 1.82 | 0 | 29.9 | 140.50 | 3.78 | 38.50 | 417 |
| Comparative Example 5 | 6.50 | 1.80 | 208 | −1.90 | 1.79 | 2 | 30.6 | 140.30 | 3.73 | 12.50 | 519 |
| Comparative Example 6 | 6.60 | 1.80 | 318 | −1.91 | 1.83 | 0 | 29.7 | 140.20 | 3.74 | 11.50 | 528 |
| Comparative Example 7 | 6.60 | 1.80 | 174 | −1.90 | 1.84 | 1 | 29.3 | 140.10 | 3.75 | 8.60 | 682 |
| Comparative Example 8 | 2.40 | 0.40 | 8 | −1.98 | 2.41 | 1 | 24.1 | 158.20 | 3.78 | 1.90 | 1328 |

TABLE 3

| No. | Crystallinity of pyrophosphate and phosphate | Lattice change rate (%) | Li/Mn antisite defect concentration (%) | Dissolution amount of Fe and Mn after cycling (ppm) | Surface oxygen valence state | Compacted density (g/cm³) | Contact angle (°) | Porosity (%) | Gram capacity of button battery at 0.1 C (mAh/g) | Average discharge voltage of button battery (V) | Expansion of battery upon 30 days of storage at 60° C. (%) | Number of cycles corresponding to 80% capacity retention rate at 45° C. |
|---|---|---|---|---|---|---|---|---|---|---|---|---|
| Example 1-1 | 100% | 2.3 | 0.4 | 3 | −1.98 | 2.42 | 16.6 | 25.2 | 158.3 | 3.78 | 1.8 | 1895 |
| Example 2-1 | 30% | 6.3 | 1.9 | 62 | −1.88 | 2.13 | 16.7 | 25.3 | 145.2 | 3.72 | 5.6 | 1418 |
| Example 2-2 | 50% | 4.7 | 1.2 | 23 | −1.89 | 2.29 | 16.3 | 25.6 | 149.2 | 3.74 | 4.7 | 1609 |
| Example 2-3 | 70% | 3.5 | 0.8 | 23 | −1.91 | 2.32 | 16.4 | 25.2 | 151.3 | 3.75 | 3.8 | 1765 |

It could be known from a combination of Examples 1-1 to 1-33 and Comparative Examples 1-8 that the presence of the first coating layer was advantageous to reduce the Li/Mn antisite defect concentration and the dissolution amounts of Fe and Mn after cycling of the obtained material, increase the gram capacity of the battery, and improve the safety performance and cycling performance of the battery. When the Mn site and the phosphorus site were respectively doped with other elements, the lattice change rate, the antisite defect concentration, and the dissolution amount of Fe and Mn of the obtained material could be significantly reduced, the gram capacity of the battery could be increased, and the safety performance and cycling performance of the battery could be improved. The presence of the third coating layer could further relieve the corrosion of the surface of the positive electrode active material by the electrolyte solution, further reduce the dissolution amount of Fe and Mn after cycling, and significantly improve the cycling performance of the battery.

It could be known from a combination of Examples 1-2 to 1-6 that as the amount of the first coating layer increased from 3.2% to 6.4%, the Li/Mn antisite defect concentration of the obtained material gradually decreased, the dissolution amount of Fe and Mn after cycling gradually decreased, the safety performance and cycling performance at 45° C. of the corresponding battery were also improved, but the gram capacity slightly decreased. Optionally, when the total amount of the first coating layer was 4-5.6 wt %, the overall performance of the corresponding battery was the best.

It could be known from a combination of Examples 1-3 and 1-7 to 1-10 that as the amount of the second coating layer increased from 1% to 6%, the dissolution amount of Fe and Mn after cycling of the obtained material gradually decreased, the safety performance and cycling performance at 45° C. of the corresponding battery were also improved, but the gram capacity slightly decreased. Optionally, when the total amount of the second coating layer was 3-5 wt %, the overall performance of the corresponding battery was the best.

It could be known from a combination of Examples 1-11 and 1-15 and Comparative Examples 5-6 that when $Li_2FeP_2O_7$ and $LiFePO_4$ both exist in the first coating layer, especially when the weight ratio of $Li_2FeP_2O_7$ to $LiFePO_4$ was 1:3 to 3:1, particularly 1:3 to 1:1, the performance of the battery was obviously improved.

Figure 7:
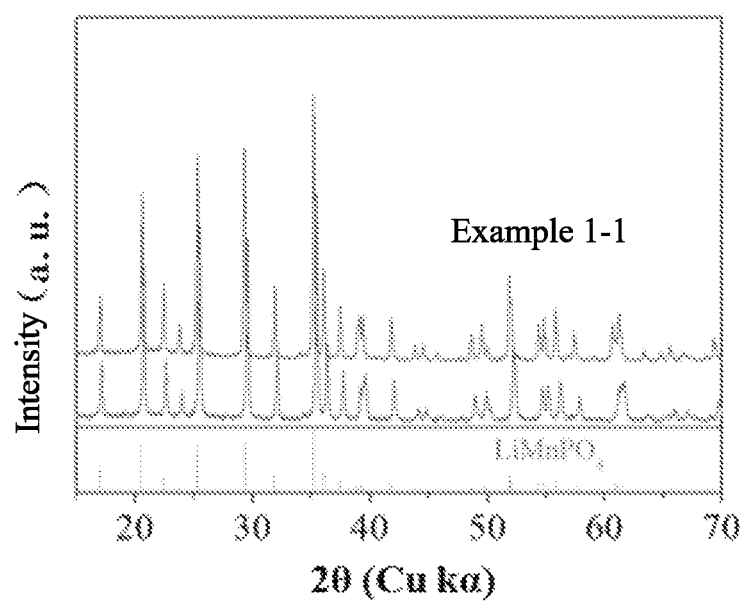
FIG. 7 shows a diagram of comparison between an XRD spectrum of an inner core of a positive electrode active material prepared in Example 1-1 and an XRD standard spectrum of lithium manganese phosphate (00-033-0804).

FIG. 7 shows a diagram of comparison between an XRD spectrum of an inner core of a positive electrode active material prepared in Example 1-1 and an XRD standard spectrum of lithium manganese phosphate (00-033-0804). As shown in FIG. 7 that the positions of the main characteristic peaks of the inner core of the positive electrode active material in the present application were basically consistent with those of lithium manganese phosphate before doping, indicating that the inner core of the positive electrode active material had no impurity phase, and the improvement of the performance of the secondary battery mainly resulted from doping with elements, rather than the impurity phase.

It could be seen from Table 3 that as the crystallinities of the pyrophosphate and the phosphate in the first coating layer gradually increased, the lattice change rate, the Li/Mn antisite defect concentration, and the dissolution amount of Fe and Mn of the corresponding material gradually decreased, the gram capacity of the battery gradually increased, and the safety performance and the cycling performance were also gradually improved.

Table 4 showed the compositions of the third coating layers in the positive electrode active materials of Examples 3-1 to 3-24.

Table 5 showed the performance data of the positive electrode active materials, the positive electrode plates, the button batteries or the full batteries of Examples 3-1 to 3-24 tested by the above performance testing methods.

TABLE 4

| | Third coating layer | | | |
|---|---|---|---|---|
| No. | Polymer | Polar functional group content α | Number-average molecular weight | Coating amount |
| Example 1-1 | Hydroxyl-terminated polydimethylsiloxane | 3.4% | 1,000 | 1% |

TABLE 4-continued

| | | Third coating layer | | |
|---|---|---|---|---|
| No. | Polymer | Polar functional group content α | Number-average molecular weight | Coating amount |
| Example 3-1 | Thiopropyl polysiloxane | 15% | 2,000 | 1% |
| Example 3-2 | Aminoethylaminopropyl polydimethylsiloxane | 12% | 3,700 | 1% |
| Example 3-3 | Side-chain-polyether-grafted polydimethylsiloxane | 7.1% | 15,412 | 1% |
| Example 3-4 | Side-chain-phosphate-grafted polydimethylsiloxane | 1.42% | 15,600 | 1% |
| Example 3-5 | Polydimethylsiloxane | 0% | 1,200 | 1% |
| Example 3-6 | Polymethylchloropropylsiloxane | 30.2% | 2,500 | 1% |
| Example 3-7 | Epoxy-terminated polysiloxane | 0.42% | 10,000 | 1% |
| Example 3-8 | Polyether-terminated polydimethylsiloxane | 10% | 2,000 | 1% |
| Example 3-9 | 1,3,5,7-octamethylcyclotetrasiloxane | 0% | 280 | 1% |
| Example 3-10 | Cyclopentadimethylsiloxane | 0% | 370 | 1% |
| Example 3-11 | Polyether-terminated polydimethylsiloxane | 55% | 25,000 | 1% |
| Example 3-12 | Hydroxyl-terminated polydimethylsiloxane | 3.4% | 1,000 | 0.01% |
| Example 3-13 | Hydroxyl-terminated polydimethylsiloxane | 3.4% | 1,000 | 0.10% |
| Example 3-14 | Hydroxyl-terminated polydimethylsiloxane | 3.4% | 1,000 | 2% |
| Example 3-15 | Hydroxyl-terminated polydimethylsiloxane | 3.4% | 1,000 | 5% |
| Example 3-16 | Hydroxyl-terminated polydimethylsiloxane | 3.4% | 1,000 | 10% |
| Example 3-17 | Hydroxyl-terminated polydimethylsiloxane | 3.4% | 1,000 | 12% |
| Example 3-18 | Polydimethylsiloxane | 0% | 400 | 1% |
| Example 3-19 | Polydimethylsiloxane | 0% | 10,000 | 1% |
| Example 3-20 | Polydimethylsiloxane | 0% | 50,000 | 1% |
| Example 3-21 | Polydimethylsiloxane | 0% | 80,000 | 1% |
| Example 3-22 | Polydimethylsiloxane | 0% | 100,000 | 1% |
| Example 3-23 | Polydimethylsiloxane | 0% | 300,000 | 1% |
| Example 3-24 | Polydimethylsiloxane | 0% | 400,000 | 1% |

TABLE 5

| No. | Lattice change rate (%) | Li/Mn antisite defect concentration (%) | Dissolution amount of Fe and Mn after cycling (ppm) | Surface oxygen valence state | Compacted density (g/cm³) | Contact angle (°) | Porosity (%) | Gram capacity of button battery at 0.1 C (mAh/g) | Average discharge voltage of button battery (V) | Expansion of battery upon 30 days of storage at 60° C. (%) | Number of cycles corresponding to 80% capacity retention rate at 45° C. |
|---|---|---|---|---|---|---|---|---|---|---|---|
| Example 1-1 | 2.3 | 0.4 | 3 | −1.98 | 2.42 | 16.6 | 25.2 | 158.3 | 3.78 | 1.8 | 1895 |
| Example 3-1 | 2.3 | 0.4 | 5 | −1.98 | 2.43 | 15.9 | 25.8 | 158.4 | 3.78 | 1.7 | 1793 |
| Example 3-2 | 2.4 | 0.4 | 3 | −1.98 | 2.42 | 15.3 | 24 | 158.1 | 3.78 | 1.8 | 1811 |
| Example 3-3 | 2.4 | 0.5 | 4 | −1.98 | 2.41 | 13 | 25.6 | 158.2 | 3.78 | 1.6 | 1777 |
| Example 3-4 | 2.3 | 0.4 | 5 | −1.98 | 2.42 | 17 | 25.3 | 158.4 | 3.78 | 1.6 | 1789 |
| Example 3-5 | 2.4 | 0.4 | 4 | −1.98 | 2.43 | 19.8 | 26.9 | 158.5 | 3.78 | 1.8 | 1680 |
| Example 3-6 | 2.5 | 0.4 | 2 | −1.98 | 2.42 | 18.3 | 25.2 | 158.3 | 3.78 | 1.7 | 1699 |
| Example 3-7 | 2.4 | 0.3 | 5 | −1.98 | 2.41 | 17.9 | 26.1 | 158.1 | 3.78 | 1.8 | 1710 |
| Example 3-8 | 2.4 | 0.4 | 5 | −1.98 | 2.42 | 17.3 | 25.2 | 158.4 | 3.78 | 1.6 | 1756 |
| Example 3-9 | 2.2 | 0.4 | 3 | −1.98 | 2.42 | 15.4 | 26.6 | 158.3 | 3.78 | 1.8 | 1589 |
| Example 3-10 | 2.4 | 0.5 | 3 | −1.98 | 2.43 | 16.5 | 26.2 | 158.3 | 3.78 | 1.8 | 1571 |
| Example 3-11 | 2.5 | 0.4 | 5 | −1.98 | 2.41 | 2 | 24.9 | 158.2 | 3.78 | 1.9 | 1499 |
| Example 3-12 | 2.3 | 0.4 | 4 | −1.98 | 2.43 | 5.4 | 24.1 | 158.4 | 3.78 | 1.9 | 1489 |
| Example 3-13 | 2.4 | 0.5 | 3 | −1.98 | 2.42 | 10.2 | 24.6 | 158.3 | 3.78 | 1.9 | 1699 |
| Example 3-14 | 2.2 | 0.4 | 3 | −1.98 | 2.43 | 17.1 | 25.8 | 158.2 | 3.78 | 1.7 | 1890 |
| Example 3-15 | 2.4 | 0.4 | 4 | −1.98 | 2.42 | 18.2 | 26.9 | 157.9 | 3.78 | 1.7 | 1881 |
| Example 3-16 | 2.3 | 0.3 | 3 | −1.98 | 2.41 | 19.6 | 28.1 | 157 | 3.78 | 1.8 | 1831 |
| Example 3-17 | 2.2 | 0.4 | 3 | −1.98 | 2.42 | 22.8 | 30.2 | 156.1 | 3.78 | 1.9 | 1702 |
| Example 3-18 | 2.3 | 0.5 | 4 | −1.98 | 2.43 | 18.9 | 26.1 | 158.4 | 3.78 | 1.8 | 1641 |
| Example 3-19 | 2.2 | 0.4 | 3 | −1.98 | 2.42 | 20.8 | 27.9 | 158.5 | 3.78 | 1.7 | 1663 |
| Example 3-20 | 2.4 | 0.5 | 5 | −1.98 | 2.43 | 21.4 | 28.1 | 158.3 | 3.78 | 1.8 | 1660 |
| Example 3-21 | 2.3 | 0.4 | 3 | −1.98 | 2.41 | 22 | 28.8 | 158.3 | 3.78 | 1.9 | 1638 |

TABLE 5-continued

| No. | Lattice change rate (%) | Li/Mn antisite defect concentration (%) | Dissolution amount of Fe and Mn after cycling (ppm) | Surface oxygen valence state | Compacted density (g/cm$^3$) | Contact angle (°) | Porosity (%) | Gram capacity of button battery at 0.1 C (mAh/g) | Average discharge voltage of button battery (V) | Expansion of battery upon 30 days of storage at 60° C. (%) | Number of cycles corresponding to 80% capacity retention rate at 45° C. |
|---|---|---|---|---|---|---|---|---|---|---|---|
| Example 3-22 | 2.2 | 0.3 | 4 | −1.98 | 2.42 | 23 | 30.3 | 157.8 | 3.78 | 1.8 | 1608 |
| Example 3-23 | 2.3 | 0.4 | 3 | −1.98 | 2.42 | 23.9 | 31.9 | 157.1 | 3.78 | 1.9 | 1588 |
| Example 3-24 | 2.2 | 0.4 | 4 | −1.98 | 2.43 | 25.2 | 33.8 | 156.7 | 3.78 | 1.9 | 1569 |

It could be seen from Table 5 above that when the other elements were the same, polysiloxane satisfying one or more of an appropriate content of a polar functional group, number-average molecular weight, and coating amount was selected as the third coating layer, and the safety performance and cycling performance of the battery were further improved without affecting the energy density and dynamic performance.

It should be noted that the present application is not limited to the above embodiments. The above embodiments are exemplary only, and any embodiment that has substantially the same constitutions as the technical ideas and has the same effects within the scope of the technical solution of the present application falls within the technical scope of the present application. In addition, without departing from the gist of the present application, various modifications that may be conceived by those skilled in the art to the embodiments, and other modes constructed by combining some of the constituent elements of the embodiments also fall within the scope of the present application.

The invention claimed is:

1. A positive electrode active material with a core-shell structure, comprising an inner core and a shell coating the inner core, wherein the inner core comprises $Li_{1+x}Mn_{1-y}A_yP_{1-z}R_zO_4$, wherein x is −0.100 to 0.100, y is 0.001 to 0.500, z is 0.001 to 0.100, A is one or more selected from Zn, Al, Na, K, Mg, Mo, W, Ti, V, Zr, Fe, Ni, Co, Ga, Sn, Sb, Nb, and Ge, optionally one or more of Fe, Ti, V, Ni, Co, and Mg, and R is one or more selected from B, Si, N, and S; and the shell comprises a first coating layer coating the inner core, a second coating layer coating the first coating layer, and a third coating layer coating the second coating layer, wherein the first coating layer comprises a pyrophosphate of $MP_2O_7$ and a phosphate of $XPO_4$, and M and X are each independently selected from one or more of Li, Fe, Ni, Mg, Co, Cu, Zn, Ti, Ag, Zr, Nb, and Al;

the second coating layer comprises carbon; and the third coating layer comprises a polymer and the polymer comprises one or more selected from a polysiloxane with a linear structure and a polysiloxane with a cyclic structure.

2. The positive electrode active material according to claim 1, wherein the polymer comprises at least one structural unit represented by formula 1,

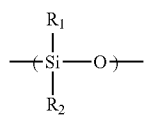

formula 1

$R^1$ and $R^2$ each independently represent H or at least one of the group consisting of the following functional groups: —COOH, —OH, —SH, —CN, —SCN, amino, a phosphate group, a carboxylate group, acylamino, an aldehyde group, sulfonyl, a polyether chain segment, a C1-C20 aliphatic hydrocarbon group, a C1-C20 halogenated aliphatic hydrocarbon group, a C1-C20 heteroaliphatic hydrocarbon group, a C1-C20 halogenated heteroaliphatic hydrocarbon group, a C6-C20 aromatic hydrocarbon group, a C6-C20 halogenated aromatic hydrocarbon group, a C2-C20 heteroaromatic aromatic hydrocarbon group, and a C2-C20 halogenated heteroaromatic hydrocarbon group.

3. The positive electrode active material according to claim 1, wherein the polysiloxane with a linear structure further comprises a capping group, and the capping group includes at least one selected from the group consisting of the following functional groups: a polyether, C1-C8 alkyl, C1-C8 halogenated alkyl, C1-C8 heteroalkyl, C1-C8 halogenated heteroalkyl, C2-C8 alkenyl, C2-C8 halogenated alkenyl, a C6-C20 aromatic hydrocarbon group, C1-C8 alkoxy, a C2-C8 epoxy group, hydroxyl, C1-C8 hydroxyalkyl, amino, C1-C8 aminoalkyl, carboxyl, and C1-C8 carboxyalkyl.

4. The positive electrode active material according claim 1, wherein the polysiloxane with a linear structure includes one or more of polydimethylsiloxane, polydiethylsiloxane, polymethylethylsiloxane, polymethylvinylsiloxane, polyphenylmethylsiloxane, polymethylhydrogensiloxane, carboxy-functionalized polysiloxane, epoxy-terminated polysiloxane, methoxy-terminated polydimethylsiloxane, polymethylchloropropylsiloxane, thiopropyl polysiloxane, aminoethylaminopropyl polydimethylsiloxane, hydroxypropyl-terminated polysiloxane, hydroxyl-terminated polydimethylsiloxane, polyether-terminated polydimethylsiloxane, aminopropyl-pendant polysiloxane, aminopropyl-terminated polydimethylsiloxane, hydroxymethyl-pendant polysiloxane, hydroxypropyl-pendant polysiloxane, side-chain-polyether-grafted polydimethylsiloxane, and side-chain-phosphate-grafted polydimethylsiloxane, and optionally includes one or more of hydroxyl-terminated polydimethylsiloxane, thiopropyl polysiloxane, aminoethylaminopropyl polydimethylsiloxane, side-chain-polyether-grafted polydimethylsiloxane, and side-chain-phosphate-grafted polydimethylsiloxane; and/or the polysiloxane with a cyclic structure includes one or more of 1,3,5,7-octamethylcyclotetrasiloxane, 1,3,5,7-tetrahydro-1,3,5,7-tetramethylcyclotetrasiloxane, cyclopentadimethylsiloxane, 2,4,6,8-tetramethylcyclotetrasiloxane, 2,4,6,8-tetramethyl-2,4,6,8-tetravinylcyclotetrasiloxane, cyclic polymethylvinylsiloxane, hexadecylmethylcyclooctasiloxane, tetradecamethylcyclcyclheptasiloxane, and cyclic polydimethylsiloxane.

5. The positive electrode active material according claim 1, wherein the polymer is selected from a polysiloxane with a linear structure.

6. The positive electrode active material according to claim 1, wherein the polymer has a number-average molecular weight of 300,000 or less.

7. The positive electrode active material according to claim 1, wherein the mass percentage content of a polar functional group in the polysiloxane is α with 0≤α<50%.

8. The positive electrode active material according to claim 1, wherein
the coating amount of the first coating layer is greater than 0 wt % and less than or equal to 7 wt % based on the weight of the inner core; and/or
the coating amount of the second coating layer is greater than 0 wt % and less than or equal to 6 wt % based on the weight of the inner core; and/or
the coating amount of the third coating layer is greater than 0 wt % and less than or equal to 10 wt % based on the weight of the inner core of the first coating layer and the second coating layer.

9. The positive electrode active material according claim 1, wherein
the phosphate of the first coating layer has an interplanar spacing of 0.345-0.358 nm and an included angle of 24.25°-26.45° for crystal orientation; and
the pyrophosphate of the first coating layer has an interplanar spacing of 0.293-0.326 nm and an included angle of 26.41°-32.57° for crystal orientation.

10. The positive electrode active material according to claim 1, wherein
in the inner core, the ratio of y to 1-y is 1:10 to 10:1; and/or
in the inner core, the ratio of z to 1-z is 1:9 to 1:999.

11. The positive electrode active material according claim 1, wherein
the weight ratio of the pyrophosphate to the phosphate in the first coating layer is 1:3 to 3:1; and/or
the pyrophosphate and the phosphate each independently have a crystallinity of 10% to 100%.

12. The positive electrode active material according to claim 1, wherein
A is selected from at least two of Fe, Ti, V, Ni, Co, and Mg.

13. The positive electrode active material according to claim 1, wherein the positive electrode active material satisfies at least one of the following conditions (1) to (4):
(1) the Li/Mn antisite defect concentration of the positive electrode active material is 4% or less;
(2) the lattice change rate of the positive electrode active material is 6% or less;
(3) the surface oxygen valence state of the positive electrode active material is −1.88 or less; and
(4) the compacted density of the positive electrode active material under 3 tons is 2.0 g/cm$^3$ or more.

14. A method for preparing a positive electrode active material, comprising the following steps:
a step of providing an inner core material, wherein: the inner core comprises $Li_{1+x}Mn_{1-y}A_yP_{1-z}R_zO_4$, wherein x is −0.100 to 0.100, y is 0.001 to 0.500, z is 0.001 to 0.100, A is one or more selected from Zn, Al, Na, K, Mg, Mo, W, Ti, V, Zr, Fe, Ni, Co, Ga, Sn, Sb, Nb, and Ge;

a coating step, involving: providing an $MP_2O_7$ powder and an $XPO_4$ suspension containing a carbon source, adding the inner core material and the $MP_2O_7$ powder into the $XPO_4$ suspension containing the carbon source, mixing same, sintering the mixture to obtain an inner core with a first coating layer and a second coating layer, and coating the obtained inner core with the first coating layer and the second coating layer with a polymer by dry coating or wet coating to obtain a positive electrode active material, wherein the polymer comprises one or more selected from a polysiloxane with a linear structure and a polysiloxane with a cyclic structure, and M and X are each independently selected from one or more of Li, Fe, Ni, Mg, Co, Cu, Zn, Ti, Ag, Zr, Nb, and Al, and
the positive electrode active material has a core-shell structure, comprising the inner core and a shell coating the inner core, with the shell comprising the first coating layer coating the inner core, the second coating layer coating the first coating layer, and the third coating layer coating the second coating layer, wherein the first coating layer comprises a pyrophosphate of $MP_2O_7$ and a phosphate of $XPO_4$, the second coating layer comprises carbon, the third coating layer comprises the polymer, and the polymer comprises one or more selected from the polysiloxane with a linear structure and the polysiloxane with a cyclic structure.

15. The method according to claim 14, wherein the step of providing the inner core material comprises the following steps:
step (1): mixing and stirring a manganese source, an element A source, and an acid in a container to obtain manganese salt particles doped with element A; and
step (2): mixing the manganese salt particles doped with element A with a lithium source, a phosphorus source, and an element R source in a solvent to obtain a slurry, and sintering the slurry under inert gas atmosphere protection to obtain lithium manganese phosphate doped with element A and element R, wherein the lithium manganese phosphate doped with element A and element R is $Li_{1+x}Mn_{1-y}A_yP_{1-z}R_zO_4$, where x is −0.100 to 0.100, y is 0.001 to 0.500, z is 0.001 to 0.100, A is selected from one or more of Zn, Al, Na, K, Mg, Mo, W, Ti, V, Zr, Fe, Ni, Co, Ga, Sn, Sb, Nb, and Ge.

16. The method according to claim 15, wherein
step (1) is performed at a temperature of 20-120° C., optionally 25-80° C.; and/or
the stirring in step (1) is performed at 500-700 rpm for 60-420 minutes.

17. The method according to claim 15, wherein
the element A source is selected from one or more of an elementary substance, a sulfate, a halide, a nitrate, an organic acid salt, an oxide or a hydroxide of element A; and/or the element R source is selected from one or more of an elementary substance, a sulfate, a halide, a nitrate, an organic acid salt, an oxide or a hydroxide of element R and an inorganic acid of element R.

18. The method according to claim 14, wherein
the $MP_2O_7$ powder is prepared by the following method: adding an element M source and a phosphorus source to a solvent to obtain a mixture, adjusting the pH of the mixture to 4-6, stirring and fully reacting the mixture, and then drying and sintering the reaction product to obtain the powder, wherein M is selected from one or more of Li, Fe, Ni, Mg, Co, Cu, Zn, Ti, Ag, Zr, Nb, or Al.

19. The method according to claim 18, wherein
the drying step is performed at 100-300° C.; and/or
the sintering is performed at 500-800° C.; and/or
in the coating step, when the inner core with the first coating layer and the second coating layer is obtained, the sintering is performed at a temperature of 500-800° C. for 4-10 hours.

20. A positive electrode plate, comprising a positive electrode current collector and a positive electrode film layer arranged on at least one surface of the positive electrode current collector, wherein the positive electrode film layer comprises the positive electrode active material according to claim 1 or a positive electrode active material prepared by the method according to any one of claim 14, and the content of the positive electrode active material in the positive electrode film layer is 10 wt % or more.

* * * * *